United States Patent
Sun

(10) Patent No.: US 10,981,464 B1
(45) Date of Patent: Apr. 20, 2021

(54) METHODS AND SYSTEMS FOR FACILITATING CHARGING SESSIONS FOR ELECTRIC VEHICLES

(71) Applicant: NAD Grid Corp, Cupertino, CA (US)

(72) Inventor: Thomas Shaofeng Sun, Cupertino, CA (US)

(*) Notice: Subject to any disclaimer, the term of this patent is extended or adjusted under 35 U.S.C. 154(b) by 0 days.

(21) Appl. No.: 16/983,175

(22) Filed: Aug. 3, 2020

Related U.S. Application Data

(63) Continuation-in-part of application No. 16/843,874, filed on Apr. 8, 2020, now abandoned, which is a continuation-in-part of application No. 16/741,712, filed on Jan. 13, 2020, now Pat. No. 10,836,274.

(60) Provisional application No. 63/048,577, filed on Jul. 6, 2020.

(51) Int. Cl.
*H02J 7/00* (2006.01)
*H02J 7/14* (2006.01)
*B60L 53/66* (2019.01)
*B60L 53/62* (2019.01)
*G06Q 50/30* (2012.01)
*G06Q 10/02* (2012.01)

(52) U.S. Cl.
CPC .............. *B60L 53/66* (2019.02); *B60L 53/62* (2019.02); *G06Q 10/02* (2013.01); *G06Q 50/30* (2013.01); *B60L 2240/70* (2013.01)

(58) Field of Classification Search
USPC ....................................................... 320/109
See application file for complete search history.

(56) References Cited

U.S. PATENT DOCUMENTS

| | | | | |
|---|---|---|---|---|
| 10,814,741 | B2* | 10/2020 | Homma | B60L 53/50 |
| 2013/0110296 | A1* | 5/2013 | Khoo | B60L 53/31 |
| | | | | 700/286 |
| 2014/0184170 | A1* | 7/2014 | Jeong | G06Q 50/06 |
| | | | | 320/137 |
| 2014/0336965 | A1* | 11/2014 | Mori | H01M 10/46 |
| | | | | 702/63 |
| 2016/0159239 | A1* | 6/2016 | Shi | B60L 55/00 |
| | | | | 320/134 |
| 2017/0274792 | A1* | 9/2017 | Vaughan | B60L 53/14 |
| 2017/0276503 | A1* | 9/2017 | Oh | B60L 53/63 |
| 2019/0139107 | A1 | 5/2019 | Khoo et al. | |
| 2019/0139161 | A1* | 5/2019 | Sakuma | G06Q 20/10 |
| 2019/0143828 | A1* | 5/2019 | Sawada | G01C 21/3438 |
| | | | | 340/934 |
| 2019/0143833 | A1* | 5/2019 | Shen | B60L 58/16 |
| | | | | 701/22 |
| 2019/0210468 | A1* | 7/2019 | Wittl | H02J 7/0027 |

(Continued)

*Primary Examiner* — Alexis B Pacheco
(74) *Attorney, Agent, or Firm* — Ivan J. Wong

(57) ABSTRACT

Embodiments of a method and/or system for charging one or more electric vehicles (e.g., based on one or more reserved charging sessions; for charging an electric vehicle during a scheduled time period; etc.) can include: receiving a reservation request (e.g., a reservation request including one or more reservation parameters; etc.); scheduling a reserved charging session based on the reservation request (e.g., based on reservation parameters from the reservation request; etc.); determining a check in at an Electric Vehicle Service Equipment (EVSE) for the reserved charging session; and/or causing the EVSE to charge the electric vehicle based on the reserved charging session (e.g., during the scheduled time period; etc.).

15 Claims, 19 Drawing Sheets

(56) References Cited

U.S. PATENT DOCUMENTS

| | | | | |
|---|---|---|---|---|
| 2019/0351775 A1* | 11/2019 | Jang | ................ | G06Q 50/06 |
| 2019/0386502 A1* | 12/2019 | Penilla | ............... | G01C 21/3484 |
| 2019/0389315 A1* | 12/2019 | Zhu | ................ | B60L 53/14 |
| 2020/0055419 A1* | 2/2020 | Kim | ................ | B60L 58/12 |
| 2020/0070672 A1* | 3/2020 | Vahedi | ............... | H02J 7/02 |

* cited by examiner

Example Load Control Slider Element of User Interface:

LOAD CONTROL (kW)
Adjust to balance ongoing electricity load for the EVSEs at this site

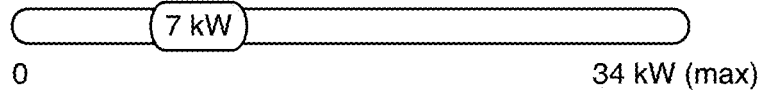

0                                          34 kW (max)

Example Load Control Scheduling Elements of User Interface:

SCHEDULE LOAD ADJUSTMENT
Adjust to balance electricity load for the EVSEs at this site during specified window DATE AND TIME
After specified time, electric load will return to default

DATE                   START TIME                   END TIME

LOAD CONTROL (kW)

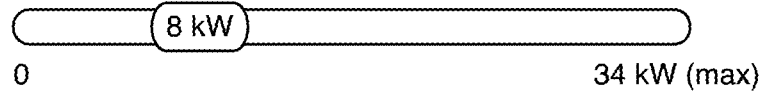

0                                          34 kW (max)

DEFAULT LOAD (kW)

0                                          34 kW (max)

FIG. 6B

| n | n | n | n | n | n | n | n | n | n | n | n | n | n | n | n | n | n | n | n |
|---|---|---|---|---|---|---|---|---|---|---|---|---|---|---|---|---|---|---|---|

FIG. 10E

| 3 | 3 | 3 | 3 | 3 | 3 | 3 | 3 | 3 | 3 | 3 | 3 | 3 | 3 | 3 | 3 | 3 | 3 | 3 | 3 |
|---|---|---|---|---|---|---|---|---|---|---|---|---|---|---|---|---|---|---|---|
| b1 | b2 | b3 | b4 | b5 | b6 | b7 | b8 | b9 | b10 | b11 | b12 | b13 | b14 | b15 | b16 | b17 | b18 | b19 | b20 |

Reservation 1 takes 6 blocks (b1-b5)
Reservation 2 takes 7 blocks (b3-b8)
Reservation 3 takes 8 blocks (b3-b10)

| 2 | 2 | 0 | 0 | 0 | 0 | 1 | 1 | 1 | 2 | 2 | 3 | 3 | 3 | 3 | 3 | 3 | 3 | 3 | 3 |
|---|---|---|---|---|---|---|---|---|---|---|---|---|---|---|---|---|---|---|---|
| b1 | b2 | b3 | b4 | b5 | b6 | b7 | b8 | b9 | b10 | b11 | b12 | b13 | b14 | b15 | b16 | b17 | b18 | b19 | b20 |

FIG. 10F

After reservation 1, b1-b5 takes 5 + 1 overstay blocks

| 2 | 2 | 2 | 2 | 2 | 2 | 3 | 3 | 3 | 3 | 3 | 3 | 3 | 3 | 3 | 3 | 3 | 3 | 3 | 3 |
|---|---|---|---|---|---|---|---|---|---|---|---|---|---|---|---|---|---|---|---|
| b1 | b2 | b3 | b4 | b5 | b6 | b7 | b8 | b9 | b10 | b11 | b12 | b13 | b14 | b15 | b16 | b17 | b18 | b19 | b20 |

After reservation 2, b3-b8 takes 6 + 1 overstay blocks

| 2 | 2 | 1 | 1 | 1 | 1 | 2 | 2 | 2 | 3 | 3 | 3 | 3 | 3 | 3 | 3 | 3 | 3 | 3 | 3 |
|---|---|---|---|---|---|---|---|---|---|---|---|---|---|---|---|---|---|---|---|
| b1 | b2 | b3 | b4 | b5 | b6 | b7 | b8 | b9 | b10 | b11 | b12 | b13 | b14 | b15 | b16 | b17 | b18 | b19 | b20 |

After reservation 3, b3-b8 takes 7 + 1 overstay blocks

| 2 | 2 | 0 | 0 | 0 | 0 | 1 | 1 | 1 | 2 | 2 | 3 | 3 | 3 | 3 | 3 | 3 | 3 | 3 | 3 |
|---|---|---|---|---|---|---|---|---|---|---|---|---|---|---|---|---|---|---|---|
| b1 | b2 | b3 | b4 | b5 | b6 | b7 | b8 | b9 | b10 | b11 | b12 | b13 | b14 | b15 | b16 | b17 | b18 | b19 | b20 |

FIG. 10G

|  | b1 | b2 | b3 | b4 | b5 | b6 | b7 | b8 | b9 | b10 | b11 |
|---|---|---|---|---|---|---|---|---|---|---|---|
| C1 | r1 | r1 | r1 | r1 | r1 | r1 | s1 | s1 | s1 | s1, r4 | S1, r4 |
| C2 |  |  | r3 | r3 | r3 | r3 | r3 | r3 | r3 | r3 | r3 |
| C3 |  |  | r2 | r2 | r2 | r2 | r2 | r2 | r2 | r4 | r4 |

FIG. 10H

```
┌─────────────────────────────────────────────────────────────┐
│ determining, based upon the availability model, a subset of the set │
│         of EVSEs having suitable availability characteristics for an │
│                     incoming vehicle S50                     │
└─────────────────────────────────────────────────────────────┘
                              │
                              ▼
┌─────────────────────────────────────────────────────────────┐
│ notifying an operator of the incoming vehicle regarding the subset │
│    of EVSEs for which the operator has right away upon availability of │
│                  one of the subset of EVSEs S51              │
└─────────────────────────────────────────────────────────────┘
```

FIG. 10J

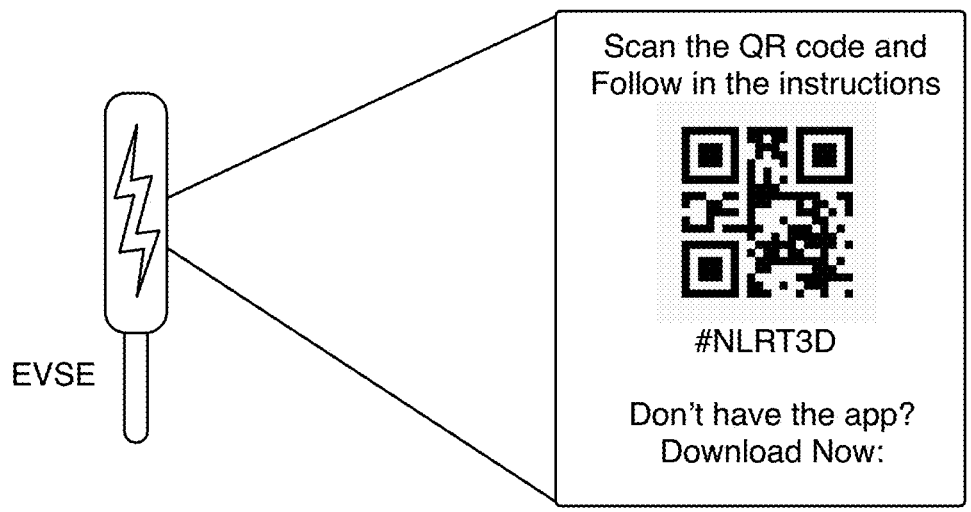

FIG. 11A

METHODS AND SYSTEMS FOR FACILITATING CHARGING SESSIONS FOR ELECTRIC VEHICLES

CROSS-REFERENCE TO RELATED APPLICATIONS

This application is a continuation-in-part of U.S. patent application Ser. No. 16/843,874, filed on Apr. 8, 2020, which is a continuation-in-part of U.S. patent application Ser. No. 16/741,712, filed on Jan. 13, 2020, each of which is incorporated in its entirety herein by this reference.

This application also claims the benefit of U.S. Provisional Application No. 63/048,577, filed on Jul. 6, 2020, which is herein incorporated in its entirety by this reference.

TECHNICAL FIELD

The disclosure generally relates to charging of electric vehicles.

BRIEF DESCRIPTION OF THE FIGURES

FIGS. 6A-6C include variations of load management in relation to an embodiment of a method.

FIGS. 10A-10J depict block diagrams and flow charts of embodiments of a portion of the method for flexible scheduling of charging sessions.

FIGS. 11A-11D depict diagrams and flow charts of embodiments of a portion fo the method for tag-based charging experience augmentation.

DESCRIPTION OF THE EMBODIMENTS

The following description of the embodiments (e.g., including variations of embodiments, examples of embodiments, specific examples of embodiments, other suitable variants, etc.) is not intended to be limited to these embodiments, but rather to enable any person skilled in the art to make and use.

1. Overview

Figure 1:
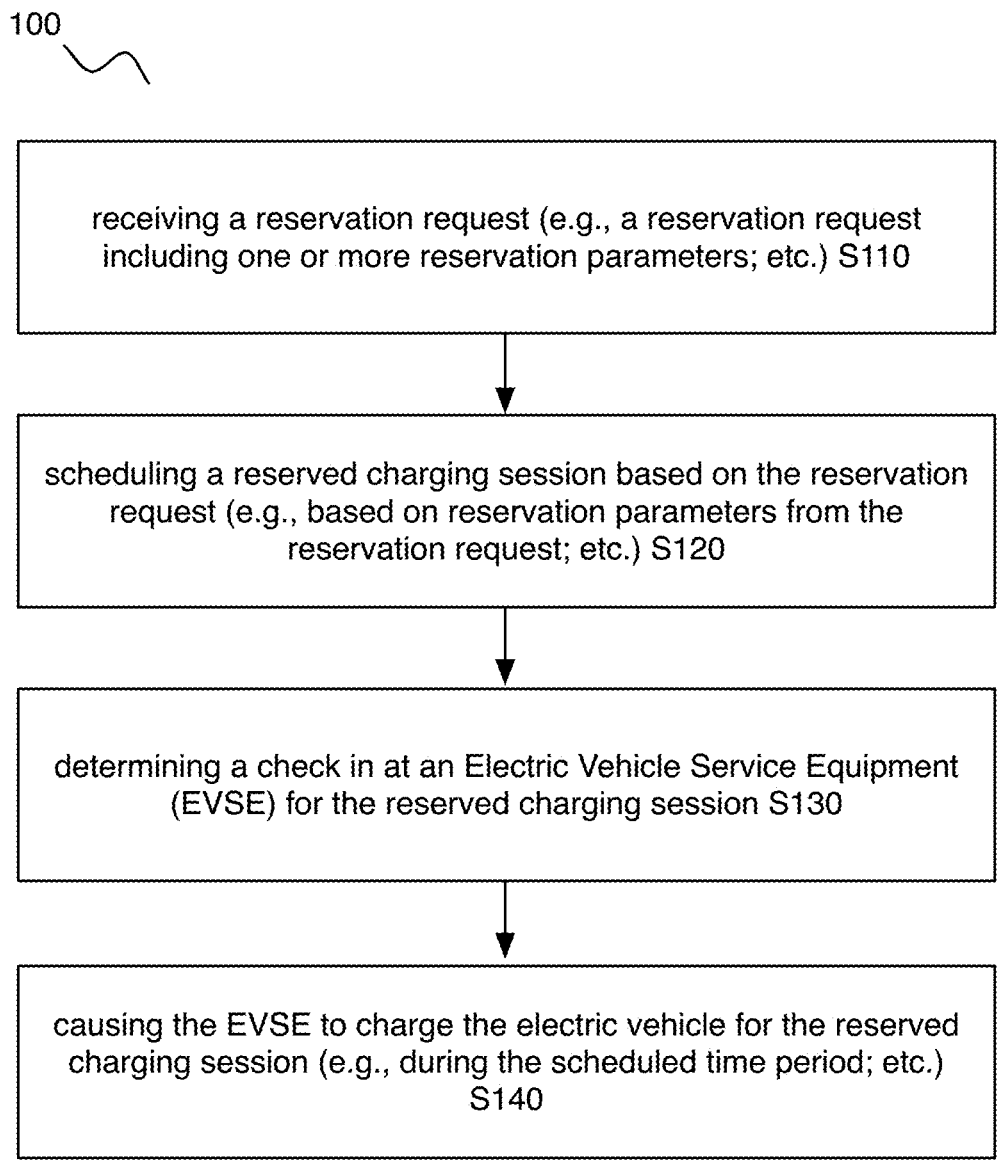
FIG. 1 includes a flowchart representation of variations of an embodiment of a method.
Figure 2:
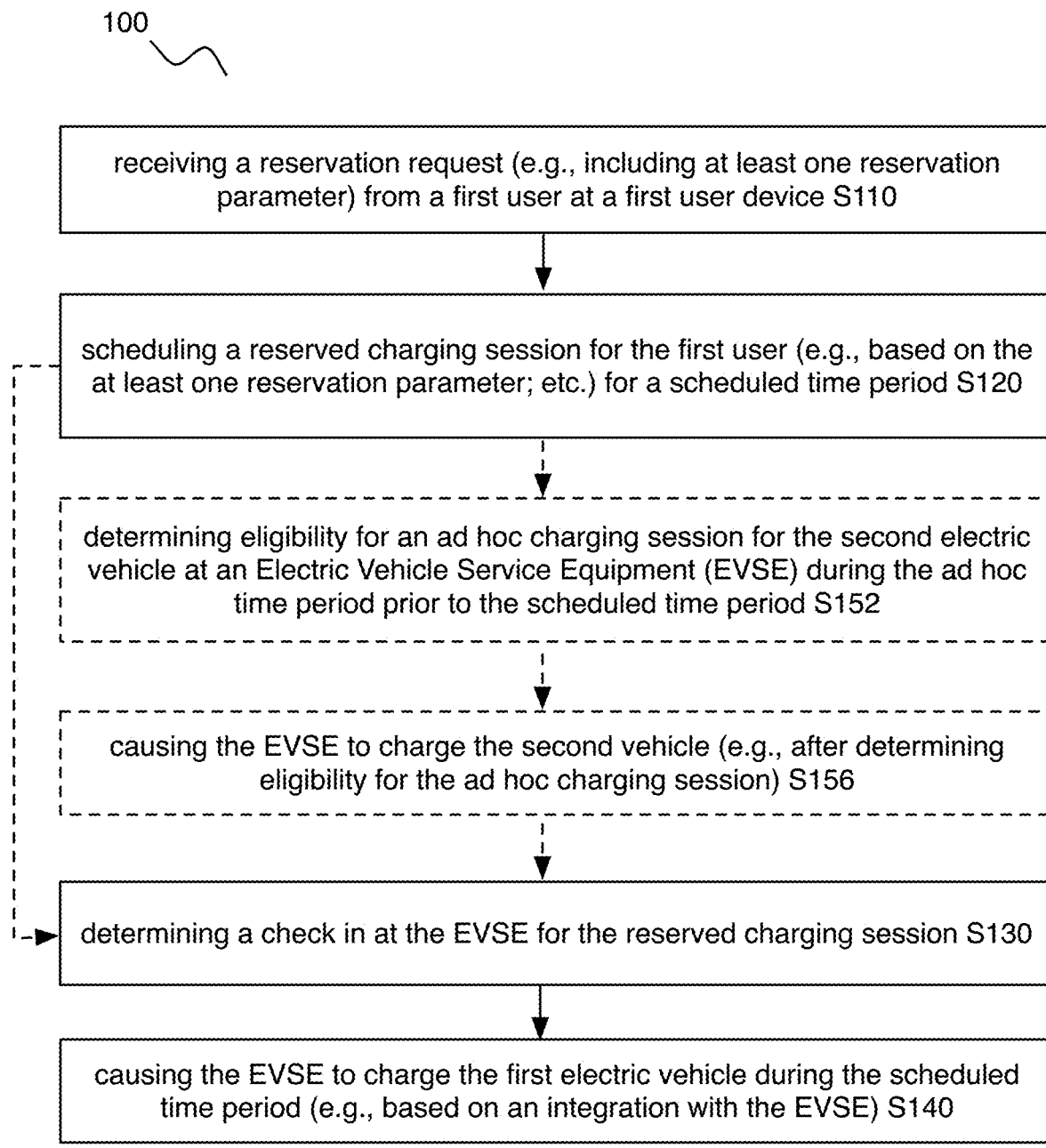
FIG. 2 includes a flowchart representation of variations of an embodiment of a method.
Figure 3:
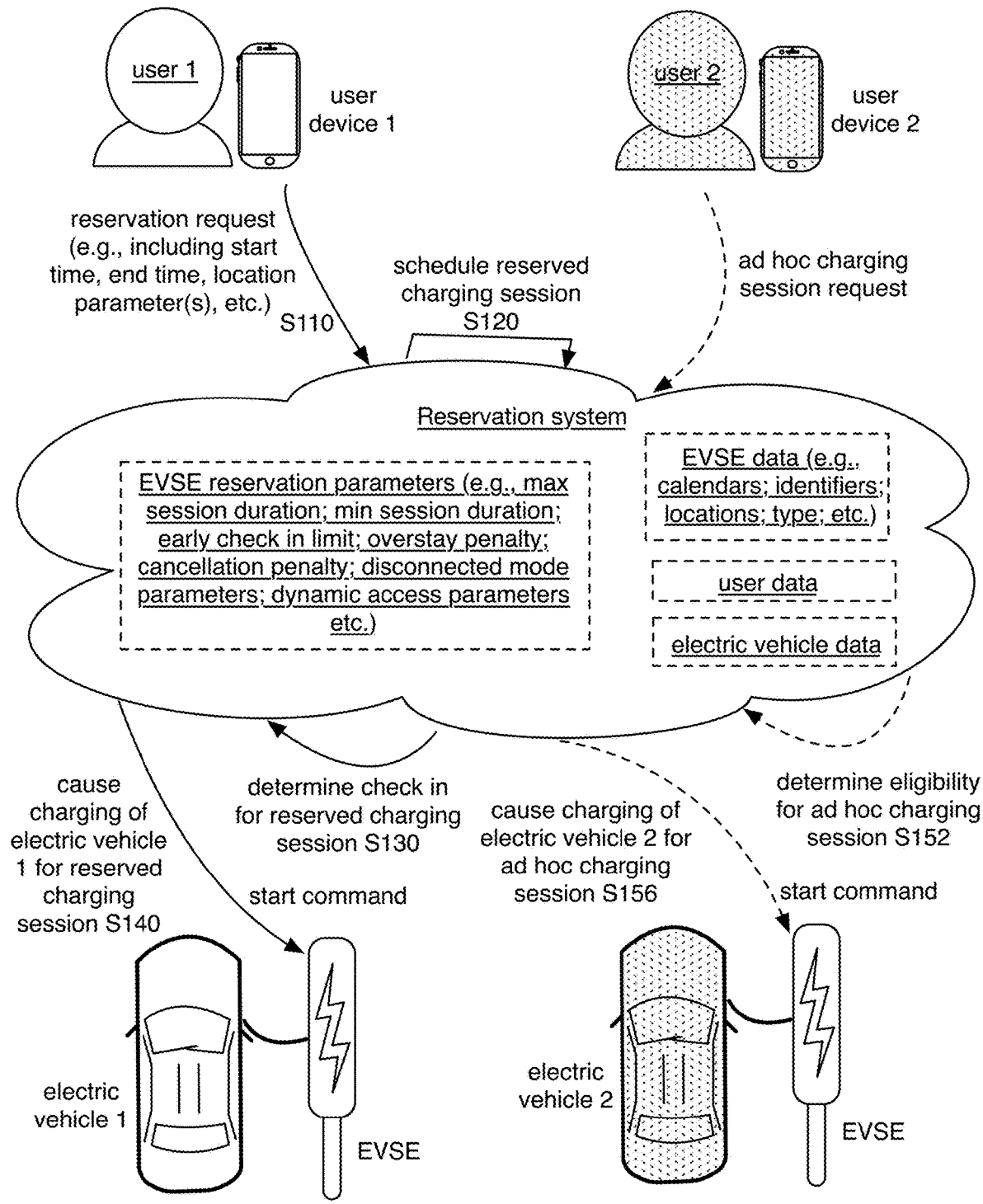
FIG. 3 includes a flowchart representation of variations of an embodiment of a method.

As shown in FIGS. 1-3, embodiments of a method 100 for charging one or more electric vehicles (e.g., based on one or more reserved charging sessions; for charging an electric vehicle during a scheduled time period; etc.) can include: receiving a reservation request (e.g., a reservation request including one or more reservation parameters; etc.) S110; scheduling a reserved charging session based on the reservation request (e.g., based on reservation parameters from the reservation request; etc.) S120; determining a check in at an Electric Vehicle Service Equipment (EVSE) for the reserved charging session S130; and/or causing the EVSE to charge the electric vehicle for the reserved charging session (e.g., during the scheduled time period; etc.) S140.

Additionally or alternatively, embodiments of a method 100 can include: facilitating an ad hoc charging session S150; providing a user interface S160; and/or providing notifications S170. However, embodiments of the method 100 can include any suitable processes for facilitating charging of one or more electric vehicles.

1.1 Reserved and Ad Hoc Charging Sessions

In a specific example, as shown in FIGS. 2-3, the method 100 (e.g., for charging a first electric vehicle during a scheduled time period and/or for charging a second electric vehicle during an ad hoc time period; etc.) can include: receiving a reservation request from a first user at a first user device (e.g., at a mobile application for the first user device; etc.), such as where the first user is associated with the first electric vehicle, and such as where the reservation request includes at least one reservation parameter indicative of the scheduled time period; scheduling a reserved charging session for the first user based on the at least one reservation parameter; determining eligibility for an ad hoc charging session for the second electric vehicle at an Electric Vehicle Service Equipment (EVSE) during the ad hoc time period prior to the scheduled time period (e.g., based on a comparison between the ad hoc time period and the scheduled time period; etc.); causing the EVSE to charge the second vehicle based on an integration with the EVSE (e.g., after determining eligibility for the ad hoc charging session; after determining that the user is eligible for the ad hoc charging session; etc.); determining a check in at the EVSE for the reserved charging session (e.g., after the ad hoc charging session for the second electric vehicle; etc.); and/or causing the EVSE to charge the first electric vehicle during the scheduled time period based on the integration with the EVSE (e.g., in response to determining the check in of the first electric vehicle at the EVSE, etc.).

Figure 4:
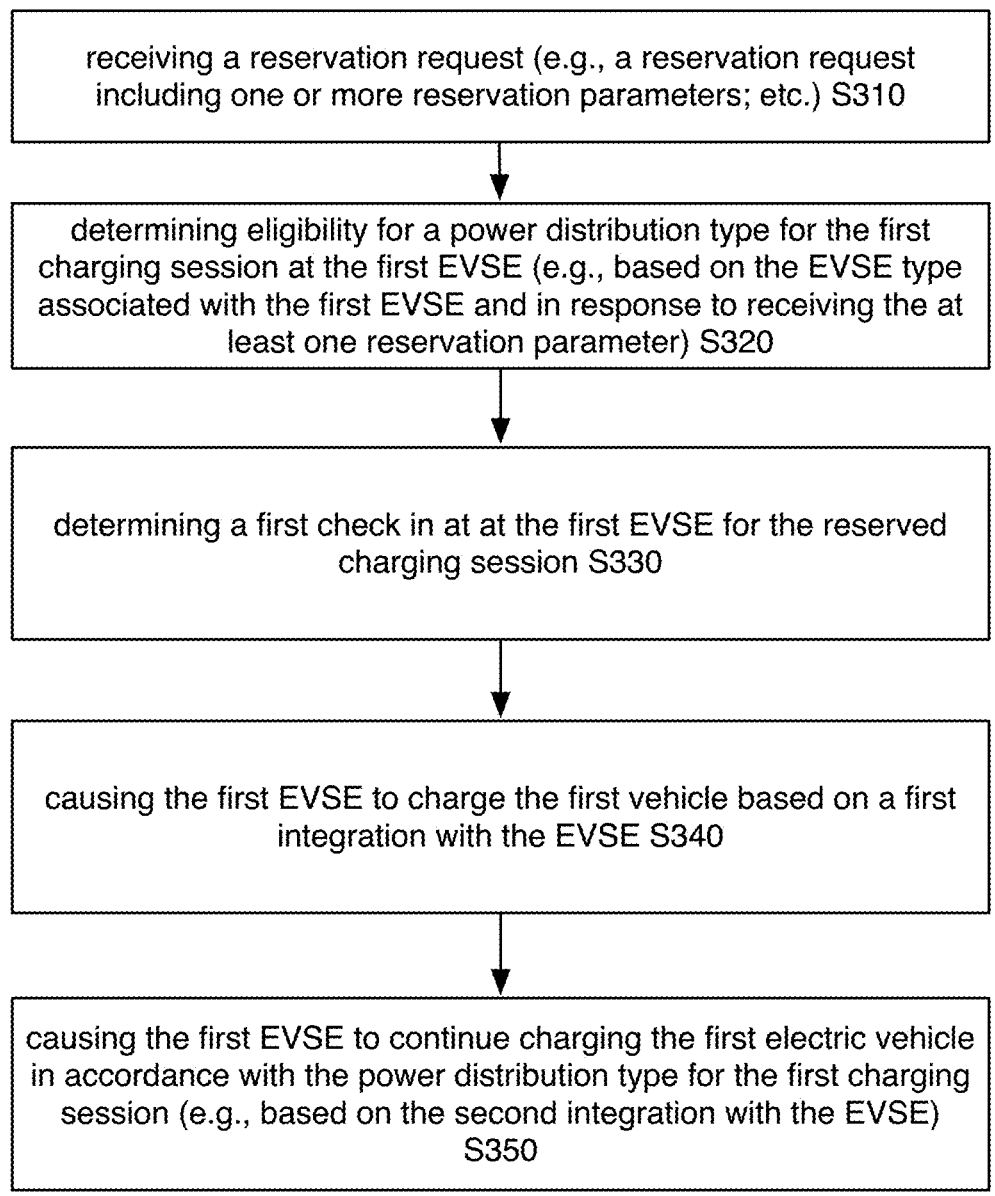
FIG. 4 includes a flowchart representation of variations of an embodiment of a method.
Figure 5:
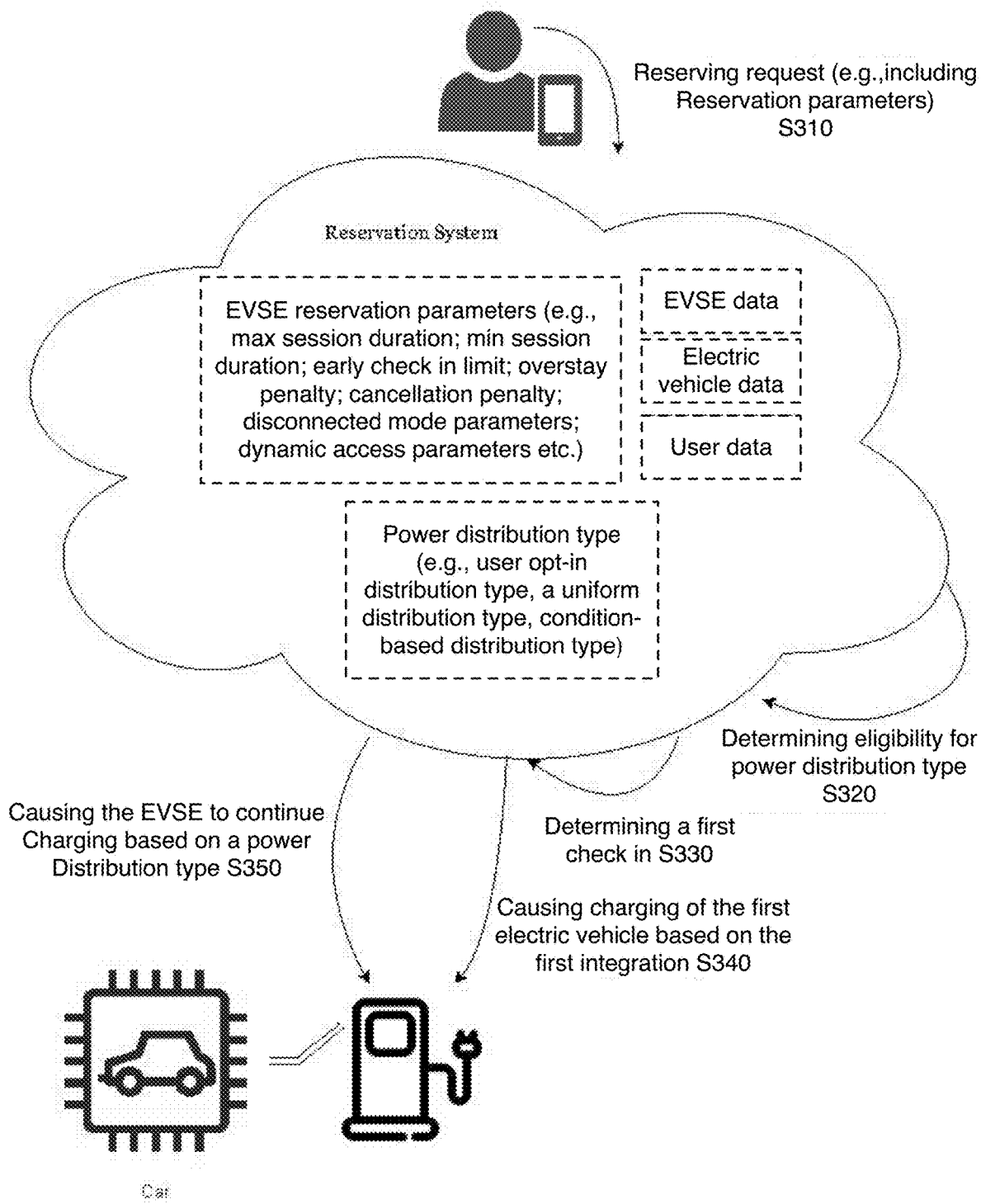
FIG. 5 includes a flowchart representation of variations of an embodiment of a method.

As shown in FIG. 4-5, embodiments of a method 300 (e.g., for charging an electric vehicle for a charging session, etc.) can include: receiving a reservation request from a first user at a first user device for a first charging session, wherein the first user is associated with the first electric vehicle, and wherein the reservation request comprises at least one reservation parameter indicative of the charging session for the first electric vehicle S310; determining eligibility for a power distribution type for the first charging session at the first ESVE (e.g., in response to receiving the at least one reservation parameter, etc.) S320; determining a first check in at the first EVSE for the first charging session S330; causing the first EVSE to charge the first electric vehicle based on a first integration with the EVSE S340; causing the first EVSE to continue charging the first electric vehicle in accordance with the power distribution type for the first charging session (e.g., after determining the first check in at the first EVSE for the first charging session, etc.), based on a second integration with the EVSE S350.

1.2 Load Management and Distribution

Figure 6A:
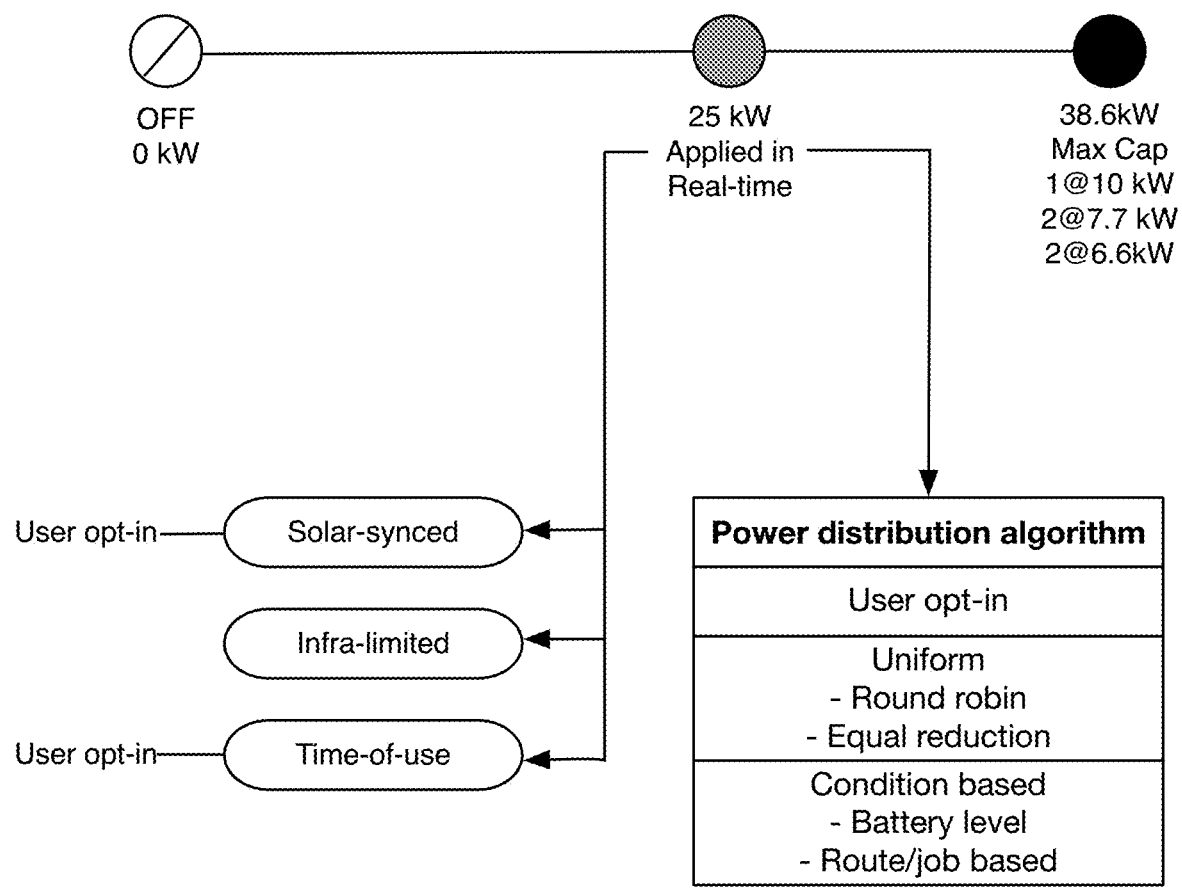

In a specific example, as shown in FIG. 6A, the method 300 can include directly controlling load management and distribution for one or more EVSEs (e.g., via OCPP and/or other suitable protocols, such as protocols described herein, etc.), where controlling load management can include causing power throttling between 0 and the max capacity for the one or more EVSEs. In more detail, the method 300 can include programmatically controlling each EVSE, with detection of load on each EVSE, in relation to a maximum (e.g., maximum specified) load aggregated from the maximum load each EVSE can deliver. The method 300 can then allow a controller (e.g., controller functionality of a system executing an application for EVSE control) to execute instructions for adjusting the electricity load delivered for each of the EVSEs (e.g., in real time), for instance, as shown in FIG. 6B (top).

In one variation of adjusting load delivery, the delivery output of each EVSE can be adjusted (e.g., throttled, increased, etc.) simultaneously (e.g., to the same percentage, to the same delivery rate, to provide the same total energy delivered, etc.). In one example, the system can determine a percentage by which delivery is throttled, based upon a ratio between an input constraint and a summation of the maximum load each EVSE can deliver (e.g., a collective maximum power output). For instance, the input constraint (e.g., 7 kW output) can be determined using a controller (e.g., controller functionality of an application for managing distribution across a set of EVSEs), and for a set of EVSEs having a collective maximum power output (e.g., of 34 kW), the throttling percent can be determined as: input constraint/collective maximum power output=7 kW/34 kW 20%. In a related example, for a first EVSE having a first power output rating (e.g., 7 kW) and a second EVSE having a second power output rating (e.g., 10 kW), the throttling percent can be determined as: input constraint/collective maximum power output=7 kW/(7 kW+10 kW)~41%.

In related examples, the adjusted throttling amount can change in real time based upon traffic, based upon how many chargers are in use, and/or based upon other suitable factors. For instance, in the example above, for a first vehicle charging at the first EVSE and a second vehicle charging at the second EVSE, the first car will receive 7 kW*41% throttling amount=2.8 kW, and the second car will receive 10 kW*41% throttling amount=4.1 kW. Then, if the first vehicle terminates charging at the first EVSE but the second vehicle continues charging at the second EVSE, the second vehicle will receive 7 kW due to the input constraint of 7 kW.

Figure 6C:
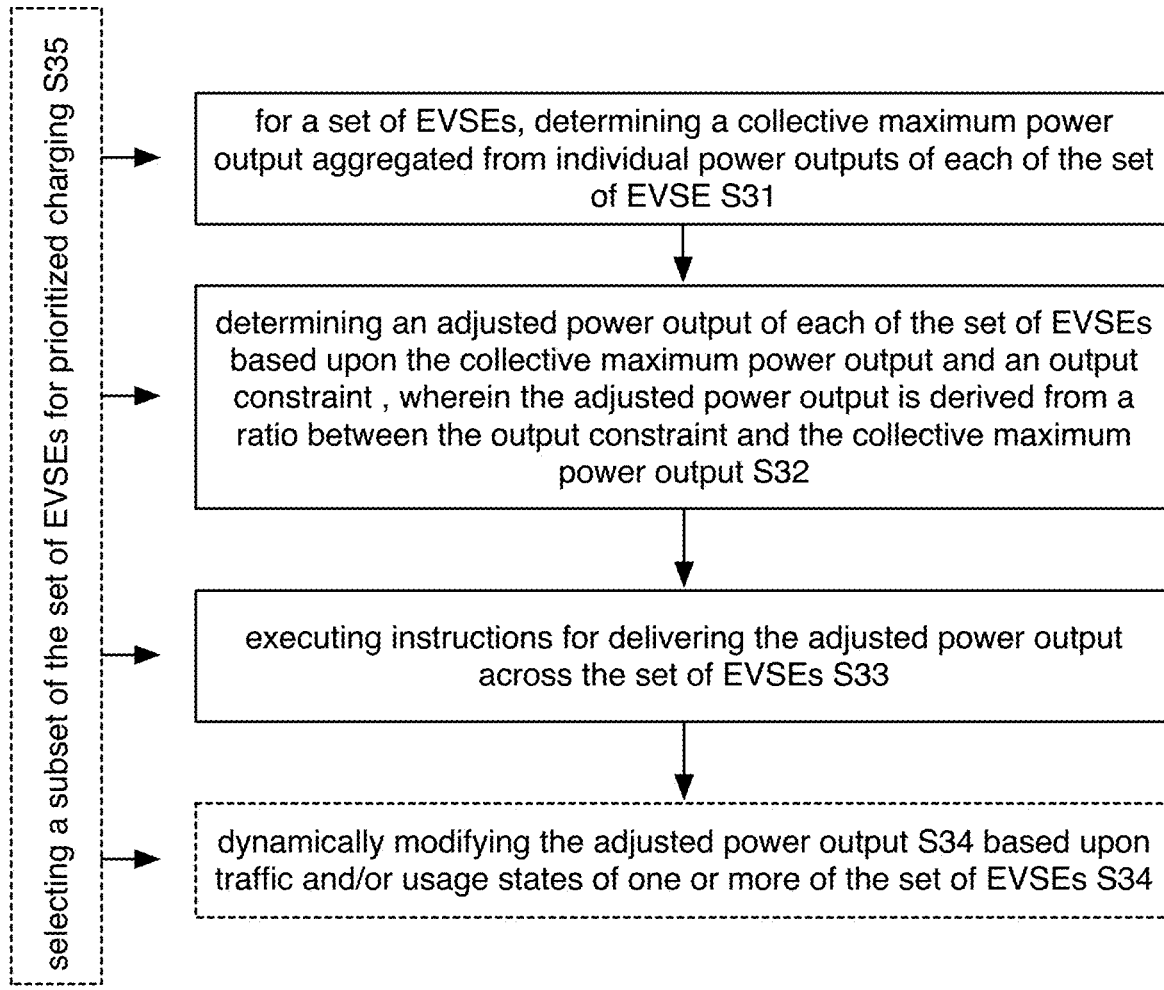

As such, as shown in FIG. 6C, the method 300 can include: for a set of EVSEs, determining a collective maximum power output aggregated from individual power outputs of each of the set of EVSE S31; determining an adjusted power output of each of the set of EVSEs based upon the collective maximum power output and an output constraint (e.g., an output constraint determined by an operator, a pre-determined output constraint, an output constraint determined based upon other factors described throughout this disclosure, etc.), wherein the adjusted power output is derived from a ratio between the output constraint and the collective maximum power output S32; and executing instructions for delivering the adjusted power output across the set of EVSEs S33 (e.g., in response to or in coordination with a set of reserved, ad hoc, and/or spontaneous charging sessions associated with the set of EVSEs). Executing instructions in relation to step S33 can include generating control instructions associated with implementation of the adjusted power output parameters across the set of EVSEs (or a subset of the EVSEs), where the control instructions can be stored in non-transitory media. Then, the system can execute the control instructions to perform one or more steps of the method 300.

In variations, the output constraint can be a limiting power output (e.g., a power output value less than or equal to the collective maximum power output), and the adjusted power output can be throttled by a percent determined from the ratio between the output constraint and the collective maximum power output. In variations, the method 300 can include dynamically modifying the adjusted power output S34 based upon traffic and/or usage states of one or more of the set of EVSEs (e.g., modifying the adjusted power output in response to at least one of increased occupancy of the set of EVSEs and decreased occupancy of the set of EVSEs). For instance, the adjusted power output can be re-determined upon initiation and/or termination of charging by a vehicle of a set of vehicles interacting with the set of EVSEs. In particular, the adjusted power output can be determined based upon the ratio: output constraint/sum(maximum delivery load$_i$), where i is an index for each EVSE undergoing a charging session.

In these variations, the EVSEs can be identical in terms of specified maximum power output and/or other characteristics, or can alternatively be non-identical in characteristics.

In a variation of the method 300 for condition-based power distribution, shown in FIG. 6C, the method 300 can include selecting a subset of the set of EVSEs for prioritized charging S35, and executing instructions for prioritizing charging of a set of vehicles through the subset of EVSEs, based upon a set of conditions S36. Selecting the subset of EVSEs for prioritized charging can be based upon distribution characteristics of the EVSEs (e.g., in relation to DC fast charging capability, in relation to other charging capabilities), location characteristics of the EVSEs (e.g., identification of geographic location characteristics of the EVSEs, in relation to remoteness, in relation to proximity to commercial areas, in relation to proximity to rural areas, in relation to proximity to residential areas, etc.), usage data for the EVSEs (e.g., prioritizing charging through heavily used EVSEs, in order to improve traffic flow, prioritizing charging through less-heavily-used EVSEs, in order to equalize maintenance requirements across the set of EVSEs), EVSE state characteristics (e.g., prioritizing charging through properly-operating EVSEs, etc.), EVSE connectivity states (e.g., prioritizing charging through EVSEs that are connected to a cloud-based platform, etc.), and/or other suitable characteristics. In variations where charging through a subset of EVSEs is prioritized, the method 300 can include stopping (e.g., temporarily stopping) charging through a non-prioritized subset of EVSEs, throttling charging through the non-prioritized subset of EVSEs (e.g., reducing load delivered through the non-prioritized subset of EVSEs relative to the prioritized subset of EVSEs), or otherwise postponing charging through the non-prioritized subset of EVSEs in another suitable manner.

Additionally or alternatively, variations of step S35 for condition-based power distribution can include selecting a subset of the set of EVSEs for prioritized charging based upon characteristics of the vehicles and/or users of vehicles intended to be charged. In one variations, users belonging to a particular user group can be prioritized, and, upon verification of such users, EVSEs selected for charging the vehicle(s) of the user(s) can be configured for prioritized. As such, the method 300 can include: at an EVSE, verifying an identify of a vehicle and/or user of a vehicle of a particular user group S36, and upon verification of the identity, configuring the EVSE (e.g., remotely configuring the EVSE, upon generation of control instructions for the EVSE) for prioritized charging of the vehicle at the EVSE S37. The particular group can be characterized by a common business entity (e.g., in relation to business affiliation, in relation to employment, in relation to business promotion, in relation to customer/vendor relationship, etc.), by a vehicle fleet, by an organization membership, by association with civil service operations (e.g., law enforcement operations, fire department operations, etc.), by association with healthcare/first response services (e.g., in relation to ambulance operations, etc.), by delivery entity or operation (e.g., in relation to package delivery services), or by another suitable grouping.

Additionally or alternatively, in relation to step S35, the subset of the set of EVSEs for prioritized charging can be selected based upon characteristics or states of the vehicles. Example characteristics can include vehicle charge state (e.g., state of charge below a threshold level of charge), vehicle state in relation to a mission (e.g., based upon an analysis of suitable charge state relative to an intended mission determined through a GPS route of the vehicle or destination of the vehicle determined in another manner), vehicle failure state, or other suitable vehicle state. As such, the method 300 can include: at an EVSE, verifying a status (e.g., charge status, mission status, etc.) of a vehicle and/or user of a vehicle of a particular user group S38, and upon verification of the status, configuring the EVSE (e.g., remotely configuring the EVSE, upon generation of control instructions for the EVSE) for prioritized charging of the vehicle at the EVSE S37.

In relation to load management and distribution across a set of EVSEs, the system can enable implementation of scheduled load management controls, such that operating managers of the set of EVSEs can schedule various adjusted power output settings for one or more of the EVSEs. Scheduling of adjusted power output settings can be based upon selection of particular time windows, based upon future events (e.g., triggering events, anticipating events), or based upon other factors. Scheduling functionality (e.g., of an application for managing EVSE operation) can be provided as part of a premium package/subscription or standard package/subscription. In one example, as shown in FIG. 6B (bottom), the system can receive an input from a managing operator (e.g., through a mobile application, through a web application, through another application), where the input indicates a default load distribution cap. The system can additionally receive an input from the managing operator indicating future events (e.g., through a calendar tool, as described below) and associate power output adjustment settings (e.g., between 8 AM and 10 AM PT on 12 Dec. 2020, throttle load for a subset of EVSEs to 50%). In this example, power output settings for the EVSEs involved would the receive instructions to transition from the default load distribution cap when entering the time window for output throttling. and transition to the default load distribution when leaving the scheduled time window for output throttling.

In relation to the above load management and distribution examples, an overarching energy management system (EMS) can operate at an appropriate scale (e.g., building scale, site scale, block scale, street scale, town scale, city scale, other geographic domain scale, etc.) in order to control energy load to devices and/or other apparatuses interfacing with the grid. As such, the system associated with load management and distribution can include structural and/or software architecture interfaces with the EMS, in order to allow load control ability (e.g., through an application with a corresponding application programming interface, API) of EVSEs in coordination with the EMS. As such, a platform portion of the EMS can manage all EVSEs covered by the EMS, and the API of the system can include architecture for adjusting power output (e.g., in relation to adjusting load value and duration) and/or resetting power output to a default value (e.g., maximum output, limited output, etc.).

1.3 Authentication Codes

Figure 7:
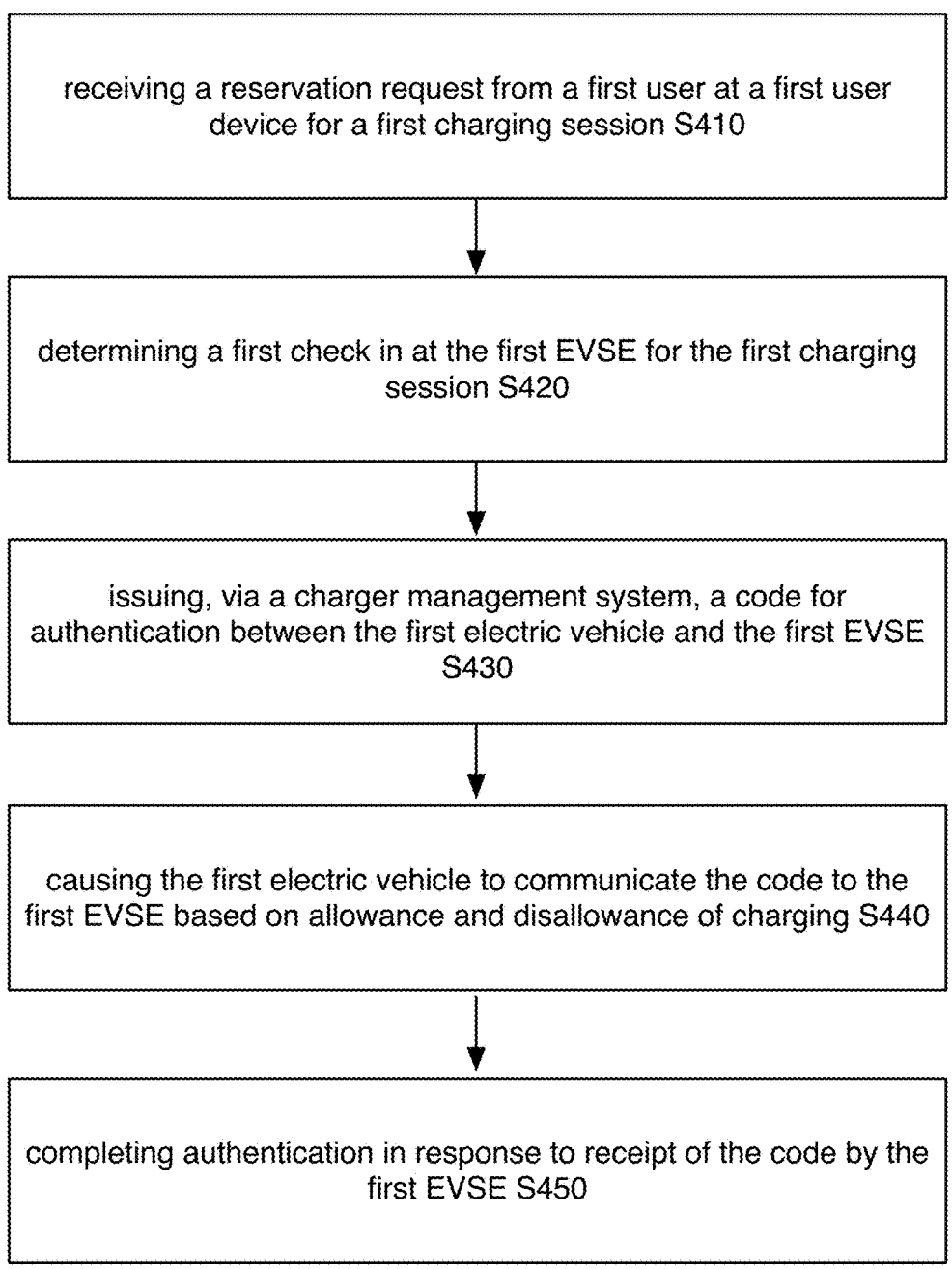
FIG. 7 includes a flowchart representation of variations of an embodiment of a method.

As shown in FIG. 7, embodiments of a method 400 (e.g., for charging a first electric vehicle at an EVSE), can include: receiving a reservation request from a first user at a first user device for a first charging session S410 (e.g., wherein the first user is associated with the first electric vehicle, and wherein the reservation request comprises at least one reservation parameter indicative of the first charging session for the first electric vehicle; etc.); determining a first check in at the first EVSE for the first charging session S420; issuing, via a charger management system, a code for authentication between the first electric vehicle and the first EVSE S430; causing the first electric vehicle to communicate the code to the first EVSE based on allowance and disallowance of charging S440; and/or completing authentication in response to receipt of the code by the first EVSE S450.

In a specific example, as shown in FIG. 1, the method 100 (e.g., for charging an electric vehicle for a reserved charging session, etc.) can include: receiving a reservation request including a reservation parameter indicative of a scheduled time period; scheduling the reserved charging session based on the reservation parameter; determining a check in of the electric vehicle at an EVSE for the reserved charging session; and causing the EVSE to charge the electric vehicle in association with the scheduled time period based on an integration with the EVSE (e.g., in response to determining the first check in of the electric vehicle at the EVSE, etc.).

Embodiments of the methods 100, 300, 400 and/or the system 200 can function to enable any EVSE (e.g., any charging equipment) to handle ad hoc and/or reserved charging. Embodiments can function to improve user experience with charging electric vehicles by improving interoperability, reliability (e.g., where reservations can guarantee charging sessions at one or more EVSEs, etc.), and/or better utilization of public infrastructure. However, embodiments can include any suitable functionality.

In examples, the system and/or method can confer at least several improvements over conventional approaches. Specific examples of the method 100, 300 and/or system 200 can confer technologically-rooted solutions to issues associated with charging electric vehicles.

In specific examples, the method 100 and/or system 200, and variations and extensions thereof, can improve low interoperability between different charging networks each requiring a different mode of access to receive charging (e.g., requiring an electric vehicle user to install and use multiple applications, RFID cards, etc.). In specific examples, the method 100, 300 and/or system 200 can improve low utilization of deployed EVSEs, such as where low utilization can be caused by gas cars parked at EVSEs, deployment of an EVSE at a low-traffic location, avoidance of public charging by users due to difficulty of access and/or unpredictable availability, and/or other suitable causes. In specific examples, the method 100, 300 and/or system 200 can improve unpredictability associated with a first come first serve model for using EVSEs, where such unpredictability can lead to long wait times or having to extensively search for an open EVSE.

In specific examples, the methods 100, 300, 400 and/or system 200 can improve various areas associated with electric vehicle charging, including one or more of: shared workplace charging, shared home charging in multi-unit dwellings, shared public place charging (e.g., for faster chargers with charging session limits; for lifestyle charging where charging sessions can be completed in a manner that complements a user's lifestyle and/or schedule; etc.); road trip planning; towing (e.g., for towing a stranded electric vehicle to an EVSE that can be reserved before arrival; etc.); fleets and/or ridesharing electric vehicles (e.g., delivery fleets, transport fleets, and/or ridesharing electric vehicles that can reserve one or more EVSEs; for avoiding downtime; etc.); V1G unidirectional charging (e.g., enabling users to reserve certain EVSEs during event hours to curtail load; reserving and/or throttling L2 EVSEs into L1 EVSEs during event hours to curtail load; etc.); Vehicle to Grid (V2G) charging (e.g., enabling bi-directional EVSEs that can supply electricity back to the grid to also service electric vehicles in normal conditions; enabling reservations for vehicles able to respond to demand response events via one or more bi-directional EVSEs; etc.); autonomous electric vehicles (e.g., which can be configured to make reservations for one or more scheduled charging sessions; which can be aided by human individuals who can plug in the EVSE for the autonomous electric vehicle; etc.); and/or any other suitable areas.

In specific examples, the technology can transform entities (e.g., EVSEs, electric vehicles; etc.) into different states or things. In specific examples, the method 100, 300 and/or system 200 can cause one or more EVSEs to charge one or more electric vehicles, such as for one or more reserved charging sessions and/or ad hoc charging sessions. In specific examples, the method 100, 300 and/or system 200 can facilitate the charging of an electric vehicle from a partially charged state or empty state to a fully charged or to a more fully charged state.

Additionally or alternatively, data described herein (e.g., reservation requests; reservation parameters, EVSE reservation parameters; EVSE identifiers; other EVSE data; user identifiers; vehicle identifiers; other identifiers; user interface data; user data; electric vehicle data; reserved charging session-related data; ad hoc charging session-related data; etc.) can be associated with any suitable temporal indicators (e.g., seconds, minutes, hours, days, weeks, time periods, time points, timestamps, etc.) including one or more: temporal indicators indicating when the data was collected, determined, transmitted, received, and/or otherwise processed; temporal indicators providing context to content described by the data; changes in temporal indicators (e.g., data over time; change in data; data patterns; data trends; data extrapolation and/or other prediction; etc.); and/or any other suitable indicators related to time.

Additionally or alternatively, parameters, metrics, inputs, outputs, and/or other suitable data can be associated with value types including: scores, confidence levels, identifiers, values along a spectrum, and/or any other suitable types of values. Any suitable types of data described herein can be used as inputs (e.g., for different models described herein, such as scheduling models for scheduling one or more reserved charging sessions and/or in relation to one or more ad hoc charging sessions; etc.), generated as outputs (e.g., of models), and/or manipulated in any suitable manner for any suitable components associated with the method 100, 300 and/or system 200.

One or more instances and/or portions of the method 100 and/or processes described herein can be performed asynchronously (e.g., sequentially), concurrently (e.g., performing scheduling for a plurality of reserved charging sessions and/or ad hoc charging sessions for a plurality of EVSEs across a plurality of locations, for a plurality of users and associated electric vehicles; performing processes of the method 100 concurrently on different threads for parallel computing to improve system processing ability for facilitating reserved charging sessions and/or ad hoc charging sessions; etc.), in temporal relation to a trigger event (e.g., performance of a portion of an embodiment of the method 100), and/or in any other suitable order at any suitable time and frequency by and/or using one or more instances of the system 200, components, and/or entities described herein.

Embodiments of the system 200 can include a reservation system (e.g., for scheduling and/or implementing one or more reserved charging sessions and/or ad hoc charging sessions; for maintaining reservation calendars for EVSEs; for communicating with one or more EVSEs to cause charging of one or more electric vehicles; a centralized reservation system; etc.); an application (e.g., a mobile application for a mobile user device; an application including a user interface, such as for receiving inputs from a user and/or for providing information to a user; etc.); and/or other suitable components. In variations, the system 200 can include one or more EVSEs, electric vehicles, and/or any other suitable components. Components of embodiments of the system 200 can include any suitable distribution of functionality across the components.

The system 200 and/or portions of the system 200 can entirely or partially be executed by, hosted on, communicate with, and/or otherwise include: a remote computing system (e.g., a server, at least one networked computing system, stateless, stateful; etc.), a local computing system, user devices, electric vehicles, EVSEs and/or other suitable charger equipment, mobile phone device, other mobile devices, personal computing device, tablet, wearable devices, databases, application programming interfaces (APIs) (e.g., for accessing data described herein, etc.) and/or any suitable component. Communication by and/or between any components of the system can include wireless communication (e.g., WiFi, Bluetooth, radiofrequency, Zigbee, Z-wave, etc.), wired communication, and/or any other suitable types of communication.

The components of the system 200 can be physically and/or logically integrated in any manner (e.g., with any suitable distributions of functionality across the components, such as in relation to portions of the method 100; etc.). In specific examples, any suitable components of embodiments of the system 200 can perform any suitable portions of embodiments of the method 100 and/or 300. However, the method 100, 300 and/or system 200 can be configured in any suitable manner.

2.1 Receiving a Reservation Request.

Embodiments of the methods 100, 300, and/or 400 can include receiving a reservation request S110 and/or S310, which can function to receive information regarding a request for a reserved charging session (and/or ad hoc charging session; etc.).

Reservation requests are preferably digital requests received (e.g., wirelessly received; etc.) from a user at a user device. In a specific example, a reservation request can be received via a mobile application executing on a mobile user device of a user associated with an electric vehicle. In a variation, one or more reservation requests can be made at an EVSE (e.g., at a user interface of the EVSE; etc.). However, reservation requests can be made at any suitable location by any suitable devices and/or entities.

Reservation requests can be made from an entity remote from the EVSE(s) and/or charging location(s) that are requested. Additionally or alternatively, reservation requests can be made from an entity proximal (e.g., at; located near; close to; etc.) the EVSE(s) and/or charging location(s) that are requested, such as for an ad hoc charging session (e.g., a charging session for a current time at a proximal EVSE, etc.). However, reservation requests can be by entities at any suitable distance from EVSEs and/or charging locations.

Reservation requests can be manually made (e.g., by a user) and/or automatically made (e.g., by autonomous electric vehicles and/or non-autonomous electric vehicles, such as based on predefined rules; by any suitable computing devices; by a centralized reservation system; etc.). However, reservation requests can be made and/or received in any suitable manner.

Reservation requests are preferably received at a reservation system (e.g., a centralized reservation system; etc.), such as a reservation system that receives (and/or processes) reservation requests from a plurality of users for a plurality of EVSEs for charging a plurality of electric vehicles. Additionally or alternatively, reservation requests can be received at any suitable component (e.g., directly at an EVSE, etc.).

Reservation requests preferably include one or more reservation parameters indicating information (e.g., a scheduled time period for a charging session; location data; user data; etc.) regarding the requested charging session. Reservation parameters preferably include at least one of: reservation start time (e.g., start time for a charging session; etc.); reservation end time (e.g., end time for a charging session; etc.); and location (e.g., location of a user relative an EVSE and/or charging location; location coordinates of a user; such as based on location of a corresponding user device; such as based on GPS coordinates of a user device; etc.). Additionally or alternatively, reservation parameters can include any one or more of: destination data (e.g., requested destination for a charging location; etc.); origin data (e.g., current location data; etc.); EVSE data (e.g., data indicating a requested EVSE and/or associated information; data describing the EVSE, such as type of EVSE; a physical identifier; location of the EVSE; etc.); user data (e.g., user account information; location information; etc.); electric vehicle data (e.g., describing an electric vehicle to be charged in a reserved charging session; etc.); charging session data (e.g., requested charging features; etc.); location requests (e.g., indicating requested charging locations and/or EVSE(s); requested nearby institutions such as markets, restaurants, etc., nearby to the charging location; etc.); and/or any other suitable reservation parameters.

In a specific example, a reservation request can include a set of reservation parameters including a reservation start time for the reserved charging session; a reservation end time for the reserved charging session; and a location parameter indicating distance between a user (e.g., based on location of a user device; etc.) and a charging session location associated with the EVSE (e.g., a location of the EVSE; location coordinates for the EVSE; a general charging session location associated with a set of EVSEs including the EVSE; etc.).

In examples (e.g., specific examples concerning ad hoc charging sessions, etc.), a reservation request (e.g., from a user requesting an ad hoc charging session for an EVSE at a current time period, etc.) can include ad hoc reservation parameters including a reservation start time indicating a current time period (e.g., the current time at the time of the request; etc.), a reservation end time (e.g., end time for the ad hoc charging session, etc.), and/or a location parameter indicating a current location (e.g., of the user and/or user device at the time of request; such as based on current GPS location of the user device; etc.). In a specific example, a reservation request (e.g., for a reserved charging sessions; etc.) can include at least one reservation parameter including a first reservation start time for the reserved charging session, a first reservation end time for the reserved charging session, and a first location parameter (e.g., indicating distance between a first user and a charging session location associated with the EVSE; etc.); and where an ad hoc charging session can be associated with a set of ad hoc reservation parameters including a second reservation start time indicating a current time period, a second reservation end time for the ad hoc charging session, and a second location parameter indicating a current location of a second user associated with a second electric vehicle.

Figure 9:
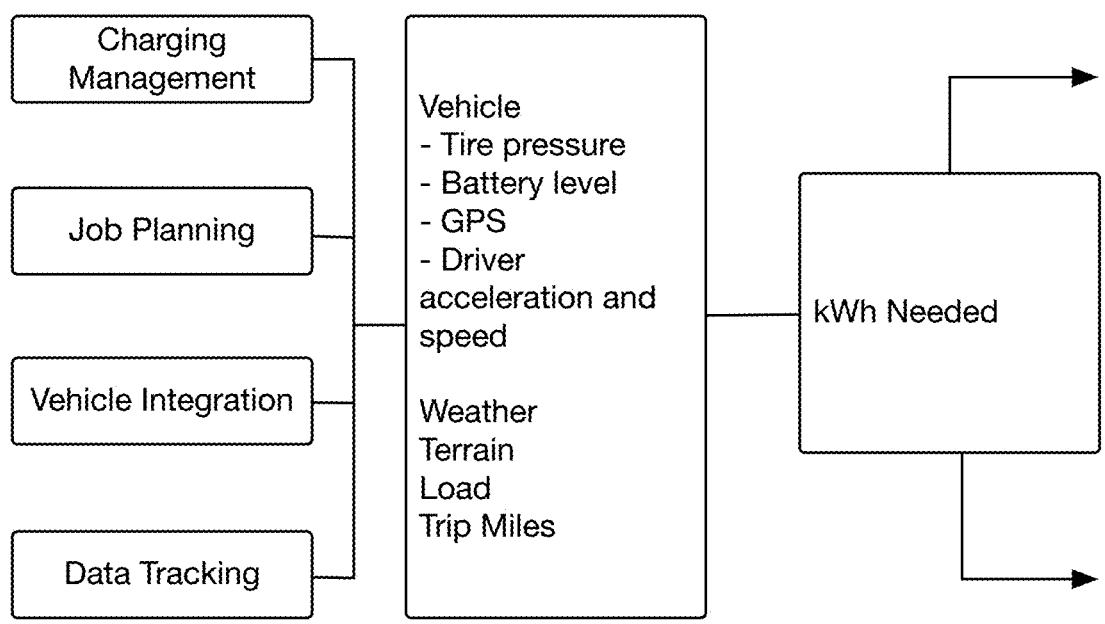
FIG. 9 includes a specific example of fleet management, such as where energy needed (e.g., in kWhs) can be predicted for any fleet job paired with a unique driver.

In examples (e.g. a specific example concerning charging sessions, etc.), a reservation request (e.g., from a user requesting a charging session for an EVSE, etc.) can include at least one power distribution parameters and/or other suitable reservation parameters indicative of how the EVSE implements charging of the electric vehicle. In examples, power distribution parameters can be implemented independent of parameters included in a reservation request (e.g., determining an optimal charging method to enable smooth fleet operations; etc.). Power distribution parameters can include one or more of a solar production parameter (based on the solar production by the EVSE during the charging session or at a period of time, etc.); an infrastructure-limitation parameter (e.g., obtained from data describing the EVSE, such as type of EVSE and location of the EVSE, etc.); a time-of-use parameter (e.g., for V1G unidirectional charging enabling users to reserve certain EVSEs during event hours to curtail load, etc.); an equally reduced power parameter (e.g., indicating permission to throttle L2 EVSEs into L1 EVSEs to curtail equally among a set of EVSE, etc.); a separately reduced power parameter (e.g., throttling L2 EVSEs into L1 EVSEs individually and separately from the set of EVSEs); and a condition-based parameter associated to a set of data that can inform battery level needed based on battery level condition of an expected route or job (e.g., using telematics data, such as vehicle data, including battery level, destination data for a plan route, origin data to indicate current location, and any other suitable data, etc.). In an example, a condition-based parameter can include charging to meet a required battery level for a job or route. The battery level needed (e.g., to complete the next job and/or route and come back to the base location) can be based on one or more of the total travel distance (e.g., collected from driver and/or job management system, etc.); the weather condition (via online weather sources, etc.); terrain (via third party data, online sources, etc.); load weight (obtained from user or job management system, etc.); and/or driver driving efficiency (e.g., calculated from real time battery data and distance travelled). In a specific example, implementing a condition-based power distribution type can include intelligently distributing power by determining the battery level needed based on the difference between current battery level and the needed battery level for the next job or route. In a specific example, as shown in FIG. 9, fleet management can include predicting energy (e.g., in kWhs) for one or more fleet jobs (e.g., predicting energy needed for a fleet job paired with a unique driver, etc.).

However, reservation parameters (e.g., reservation parameters for reserved charging sessions; ad hoc reservation parameters; etc.) can be configured in any suitable manner.

A reservation request is preferably received after (e.g., in response to; at a time after; etc.) a submission of the reservation request by an entity (e.g., by a user at a user device; etc.), but reservation requests can additionally or alternatively be received at any suitable time relative portions of embodiments of the method 100, and/or at any suitable time. In a specific example, a reservation request is received directly following a submission of a reservation request by a user at a mobile application for a user device. In a specific example, for a reservation request submitted directly at an EVSE operating in a disconnected mode (e.g., without connectivity to a centralized reservation system; without connectivity to a calendar for reservations at the EVSE; etc.), the reservation request can be received at centralized reservation system after the EVSE is able to re-connect.

However, receiving a reservation request S110 and/or S310 can be performed in any suitable manner.

2.2 Scheduling a Reserved Charging Session.

Embodiments of the methods 100, 300, and/or 400 can include scheduling one or more reserved charging sessions S120, which can function to reserve one or more charging sessions at one or more EVSEs and/or charging locations for one or more electric vehicles.

Charging sessions (e.g., a session for charging an electric vehicle; etc.) can include a reserved charging session, an ad hoc charging session (e.g., a charging session requested and/or implemented for a current, ad hoc time period; etc.), and/or other suitable types of charging sessions. A reserved charging session preferably includes a charging session that is reserved and scheduled ahead of the time period of charging. A reserved charging session is preferably associated with a scheduled time period during which charging of the electric vehicle occurs.

Scheduling one or more reserved charging sessions is preferably based on one or more reservation requests. Scheduling one or more reserved charging sessions can include processing one or more reservation parameters from one or more reservation requests, such as in order to schedule a reserved charging session according to the one or more reservation parameters. In an example, scheduling one or more reserved charging sessions can include scheduling a reserved charging session for a scheduled time period and an EVSE (and/or charging location) indicated by the set of reservation parameters from a received reservation request.

In a specific example, a reservation request can include a geographical destination parameter (e.g., coordinates and/or a destination selected by a user and/or other suitable entity; etc.), where scheduling a reserved charging session can include determining a reserved charging session location (e.g., associated with an EVSE to be used for the charging session; etc.) based on the geographical destination parameter (e.g., where the reserved charging session location can be proximal and/or at the same location of the geographical destination; etc.) and/or scheduling the reserved charging session for the reserved charging session location. A reserved charging session location can include the location of a single EVSE (e.g., where the user is directed to use the single EVSE for the reserved charging session; etc.), the general location of a plurality of EVSEs (e.g., where the user can select an EVSE to use from the plurality of EVSEs; etc.), and/or any suitable locations associated with the reserved charging session. In specific examples, determining a reserved charging session location can be based on distance between the reserved charging session and the geographical destination indicated by the geographical destination parameter; availability of one or more EVSEs at the reserved charging session location and/or at other suitable charging session locations (e.g., other proximal charging session locations; etc.); user data (e.g., user eligibility for a charging session at the reserved charging session location and/or other suitable charging session location; etc.); electric vehicle data; EVSE reservation parameters; other reservation parameters from a reservation request; and/or any other suitable data. However, scheduling one or more reserved charging sessions based on one or more reservation requests can be performed in any suitable manner.

Alternatively, scheduling one or more reserved charging sessions can be performed independent of a reservation request, such as where a reserved charging session is automatically scheduled (e.g., based on a set of predefined rules; by a centralized reservation system; etc.). In a specific example, recurring reserved charging sessions can be automatically scheduled based on one or more parameters for a recurring reservation (e.g., where parameters can indicate time interval for recurring reservations, such as daily, weekly, etc.; any suitable reservation parameters; etc.).

Scheduling one or more reserved charging sessions is preferably based on and/or associated with one or more EVSE reservation parameters. An EVSE (and/or set of EVSEs; and/or a charging location; etc.) is preferably associated with a set of EVSE reservation parameters for implementing one or more reserved charging sessions and/or ad hoc charging sessions. EVSE reservation parameters can include any one or more of: maximum session duration parameters (e.g., indicating a maximum charging session duration; etc.); minimum session duration parameters (e.g., indicating a minimum charging session duration; etc.); early check in limit parameters (e.g., indicating guidelines for when a user checks in early relative to a reservation start time for a reserved charging session; etc.); overstay penalty parameters (e.g., indicating guidelines for when a user overstays after a reservation end time for a reserved charging session; such as requiring payment of $1 per minute stayed after the reservation end time and/or requiring payment of any suitable amount; etc.); cancellation penalty parameters (e.g., indicating guidelines for when a reserved charging session is cancelled; such as charging a monetary penalty for cancelling a reserved charging session within a threshold time period before the reservation start time; etc.); disconnected mode parameters (e.g., indicating guidelines for operation in a disconnected mode in response to connectivity issues with an EVSE, such as connectivity issues between an EVSE and a corresponding cloud-based calendar for scheduling reserved charging sessions; etc.); reservation grace period parameters (e.g., indicating guidelines for when a user has not checked in and the time is after the reservation start time; indicating a hold time where a reservation is cancelled if a user has not checked in within the hold time after reservation start time; etc.); dynamic access parameters; and/or any other suitable parameters.

In a specific example, an EVSE is associated with a set of EVSE reservation parameters for implementing the reserved charging session, where the set of EVSE reservation parameters includes: a maximum session duration, a minimum session duration, an early check in limit, an overstay penalty, and a cancellation penalty.

In a specific example, a first EVSE is associated with a first set of EVSE reservation parameters for implementing a first reserved charging session, and where the first set of EVSE reservation parameters includes: a first maximum session duration, a first minimum session duration, and a first early check in limit (e.g., where causing the EVSE to charge the electric vehicle includes causing the EVSE to charge the electric vehicle in accordance with the first set of EVSE reservation parameters and/or in association with the scheduled time period; etc.). In the specific example and/or other specific examples, the method 100 can include receiving a second reservation request; scheduling a second reserved charging session based on the second reservation request, where a second EVSE is associated with a second set of EVSE reservation parameters including a second maximum session duration distinct from the first maximum session duration, a second minimum session duration distinct from the first minimum session duration, and a second early check in limit distinct from the first early check in limit; determining a second check in (e.g., of the second electric vehicle; etc.) at the second EVSE for the second reserved charging session; and/or causing the second EVSE to charge the electric vehicle (e.g., in response to determining the second check at the second EVSE for the section reserved charging session; etc.) in accordance with the second set of EVSE reservation parameters, such as based on a second integration with the second EVSE.

In examples, the minimum session duration parameter can be used in determining whether or not to allow an ad hoc charging session or reserved charging session when there is an already-scheduled, upcoming reserved charging session. In a specific example, an EVSE can be associated with a minimum session duration parameter indicating a minimum charging session duration for a charging session at the first EVSE, where the method 100 can include determining eligibility for an ad hoc charging session at the first EVSE during an ad hoc time period prior to the scheduled time period, such as based on a comparison between the minimum charging session duration and a time difference between the ad hoc time period and the scheduled time period. In a specific example, a reserved charging session and/or ad hoc charging session can be allowed if the time until an already-scheduled, upcoming reserved charging session is greater than (or equal to) the minimum session duration indicated by the minimum session duration parameter. In an example, the minimum session duration parameter can additionally or alternatively be used in creating reservation slots, such as for use in a user interface for allowing users to select reservation slots based on availability. However, the minimum session duration parameter can be configured in any suitable manner and can be used in any suitable manner for determining eligibility for an ad hoc charging session.

In examples, the early check in limit parameter can be used in determining whether a user (e.g., a user who has checked in prior to their reserved charging session start time; etc.) is able to start a charging session (e.g., an ad hoc charging session; a shifted reserved charging session; etc.) before their reserved charging session. In a specific example, an EVSE can be associated with an early check in limit parameter indicating a reservation modification to be performed based on a time difference between a reservation check in time and a reservation start time for a future reserved charging session. In examples, the reservation modification can include at least one of cancellation of the future reserved charging session and shifting of the reservation start time for the future reserved charging session reserved charging session. In specific examples, the reservation modification can be performed based on (e.g., in response to; etc.) the time difference (e.g., between a reservation check in time and a reservation start time; etc.) exceeding the scheduled duration of the reserved charging session, but can additionally or alternatively be based on any suitable comparison of the time difference to any suitable time period; and/or based on any suitable time thresholds. However, the early check in parameter can be configured in any suitable manner.

One or more EVSEs can be associated with dynamic access parameters specifying who can access the one or more EVSEs (e.g., which access groups can access the EVSEs; etc.), when the one or more EVSEs can be accessed by users eligible to access the one or more EVSEs, how the one or more EVSEs can be accessed (e.g., different pricing for different users; etc.), and/or other suitable access-related aspects. Dynamic access parameters can specify one or more access groups indicating the user(s) (e.g., categories of users; etc.) that can access a given EVSE. Different access groups can be associated with different pricing (e.g., a user will be able to access pricing specific to the access group that the user belongs to; etc.). In a specific example, a fleet site charging location (e.g., including a plurality of EVSEs, etc.) can be associated with dynamic access parameters specifying access restriction on the EVSEs during business hours, where only the fleet and employee access groups can access the EVSEs. In a specific example, the fleet access group can access the EVSEs at no cost (e.g., free charging), the employee access group can access the EVSEs at a charging pricing of $1/hr, where the EVSEs are open to the general public (e.g., not restricted to fleet and employee access groups; etc.) during non-business hours, and where the general public can access the EVSEs at a charging pricing of $3/hr. However, any suitable access groups can be specified for accessing any suitable EVSEs at any suitable time periods and at any suitable pricing.

In variations, access groups can be associated with one or more access codes. In a specific example, the access code allows the specific access capabilities corresponding to the access group (e.g., ability to charge, specific pricing, specific EVSE reservation parameters such as maximum session duration, etc.). Different access groups can be associated with different access codes. Access codes can be unique to access groups; additionally or alternatively, same access codes can provide access to different access groups. In response to users attempting to access a restricted EVSE and/or restricted charging location (e.g., associated with dynamic access parameters; etc.), a user profile can be analyzed (e.g., using a mobile application, other applications, etc.) for one or more relevant access codes that will provide the user with access. If a user profile does not include a relevant access code (and/or in any suitable scenarios), a user can be prompted (e.g., via the mobile application, other applications, the EVSE, etc.) to input the access code to gain access. In a specific example, a user only needs to enter the relevant access code once per charging location to gain and retain access.

2.2.1 Morse Code Handshake

In variations, morse code communication (e.g., a morse code handshake) between one or more electric vehicles and one or more EVSEs can be implemented (e.g., based on ISO 15118 standard and/or any other suitable standards and/or protocols, etc.). In examples, a morse code can be communicated from an electric vehicle to an EVSE for authentication allowing plug-in and charge. In examples, an access code can be communicated to the EVSE by the electric vehicle.

A charger management system (e.g., that controls the electric vehicle and EVSE in a charging session) can issue a random 0 and 1 pattern as the access code (e.g., authentication code, etc.) for an electric vehicle (e.g., via the mobile application, other applications, the EVSE, etc.), such as where the access code is required to be communicated by the electric vehicle to the EVSE to complete authentication. In specific examples, an electric vehicle can communicate a 1 by activating its built-in charger, thus allowing charging, and communicate a 0 by deactivating its built-in charger, or vice versa (e.g., via electric vehicle or vehicles capable of programmable start/stop charging, etc.). In a specific example, upon arrival for a charging session, the electric vehicle executes the 0 and 1 pattern by turning on and off its built-in charger (via programmable start/stop charging, etc.). The charger management system can detect the sequential activation and deactivation of the electric vehicle's built-in charger (e.g., by detecting charging of the electric vehicle when charging is allowed, and vice versa, etc.), where authentication can be completed upon detection of the correct code. Optionally, other characters may be communicated using 0's and 1's via Morse code. A new code of 0's and 1's can be generated for every charging session for improved security.

In a specific example, determining a check in can include generating, by a charger management system, a code (e.g., access codes, authentication codes, etc.), wherein the code includes a data sequence uniquely identifying the electric vehicle; causing the electric vehicle to communicate the code to the EVSE upon plugin of an EVSE into an electric vehicle; and wherein the check in is successful upon receiving, by the EVSE, the code as generated.

In specific examples, different 0 and 1 patterns can be generated for different charging session scenarios in order to improve security. In a specific example, a "00110" code can be issued for an electric vehicle, where the code is required to be communicated by the electric vehicle to the EVSE to complete authentication, and where each "1" in the code is communicated by the electric vehicle by activating its built-in charger, and where each "0" in the code is communicated by the electric vehicle by deactivating its built-in charger.

In a specific example, a charger management system can allow charging for 5 minutes (and/or any suitable amount of time, such as based on the charging session parameters and associated data), where the electric vehicle is expected to communicate the issued Morse code to the EVSE, and where charging will stop after 5 minutes (and/or any suitable amount of time) if the correct code is not communicated.

Figure 8:
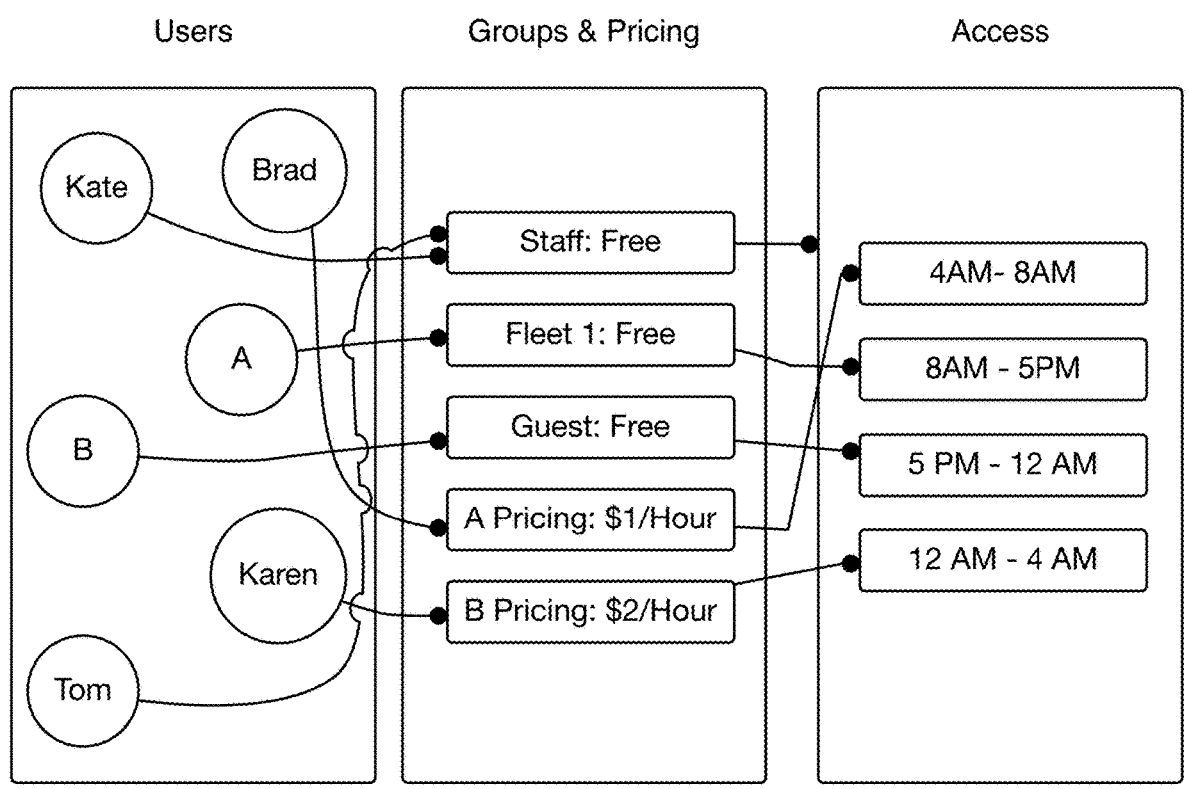
FIG. 8 includes a specific example of a flowchart representation of variations of an embodiment of a method.

In a specific example, as shown by FIG. 8, users can be grouped into different access groups (e.g. user groups; groups such as staff, faculty, fleet, student, public, and/or other suitable groups, such as a group associated with a set of electric vehicles) for dynamic access control. Codes (e.g., data sequence uniquely identifying an access group, access codes, authentication codes, etc.) can be generated for different user groups where such codes can be shared across the set of vehicles. The codes can be refreshed (e.g., on a periodic interval, such as daily, etc.). The codes can then be associated with an access parameter placed on a user group. The access parameter can include a pricing parameter specifying a pricing category (e.g., no charge, employee/fleet rate, student rate, public rate, etc.) for the access group, and/or a dedicated time slot parameter assigning dedicated charging access to different time slots. However, user groups can be configured in any suitable manner.

In variations, users can gain access to a particular access group through a request process, such as where users can request access to an access group, and an admin (e.g., host, etc.) can grant access to the access group. In specific examples, an admin sets access restricted time ranges, and for each access restricted time range, the admin can add one or more access groups to the time range, indicating the users in these access group(s) that are allowed to access the EVSE(s) (e.g., via ad hoc charging sessions and/or reserved charging sessions, etc.).

Access groups can be associated with one or more access codes and/or one or more whitelists. Additionally or alternatively, access groups can be associated with one or more blacklists (e.g., indicating users, access groups, and/or other entities who are restricted from charging). However, access groups and dynamic access parameters can be configured in any suitable manner.

In examples, cancellation of one or more reserved charging sessions can be performed by one or more of: a residential host, a site host (e.g., manager; etc.), a user (e.g., associated with the electric vehicle; etc.) and/or any other suitable entities.

EVSEs can include any suitable types of EVSEs. Types of EVSEs can differ based on appearance; access method (e.g., RFID; network account via application such as mobile application; credit card module; plugin without authentication; etc.); charging speed (e.g., level 1/L1, which can generally be residential or commercial, and/or can include a regular wall outlet such as one providing 120V, AC, adding around 5 miles/hour of charging for plugin hybrids; level 2/L2, which can generally be residential or commercial, and/or can provide 220V-240V, AC, power varying from 6.6 kW to 20 kW, adding around 20 miles or more/hour of charging; level 3/L3, which can generally be commercial or public, and/or can be DC, power of 25 kW or above; etc.); corresponding network operator; corresponding hardware original equipment manufacturer (OEM); and/or other suitable features.

Different types of EVSEs can include and/or be associated with same or different types of EVSE reservation parameters, and/or same or different values for types of EVSE reservation parameters. For example, EVSEs with higher power (e.g., 25 kW and above; etc.) can be associated with shorter maximum session duration parameters compared to EVSEs with lower power. In a specific example, a L3 EVSE can be associated with a maximum session duration of 45 minutes or less. In a specific example, a L2 EVSE can be associated with a maximum session duration from 2 hours to 4 hours. In examples, shorter maximum session durations can encourage higher turnover, but maximum session durations that are too short can lead to poor user experiences. However, any suitable EVSEs can include and/or be associated with any suitable EVSE reservation parameters.

Embodiments of a method 100 can include infrastructure management, which can include monitoring, collecting, and/or otherwise processing data from one or more EVSEs and/or other suitable hardware. However, infrastructure management can be performed in any suitable manner.

Embodiments of a method 100 can include community management (e.g., user management). Community management can include setting EVSE reservation parameters (e.g., rules, etc.) regarding how one or more EVSEs can be used. Community management admins (e.g., hosts, etc.) preferably set EVSE reservation parameters for the one or more managed EVSEs, but any suitable entities can be given access to set EVSE reservation parameters. In specific examples, EVSE reservation parameters including one or more of maximum session duration, how many chargers are reservable, overstay penalty, and/or other suitable EVSE reservation parameters can be set for one or more EVSEs. Communities (e.g., that can be managed) can include one or more charging locations and/or one or more EVSEs. Different communities can be associated with different types of hardware (e.g., different types of EVSEs; different EVSE types with different charging speeds; EVSEs synced with solar production; etc.), different user groups (e.g., fleet, employees, contractors; different access groups; etc.), where such differences can correspond to different EVSE reservation parameters. In a specific example, in communities with very cold or hot weather where battery performance drops, a longer maximum session duration can be established. In a specific example, in a community location with high traffic where a community management admin desires a higher turnover, a shorter maximum session duration can be established. However, community management can be performed in any suitable manner.

Scheduling one or more reserved charging sessions is preferably performed with a reservation system (e.g. a centralized reservation system; etc.), but can additionally or alternatively be performed by any suitable components (e.g., by an EVSE for scheduling a charging session at that EVSE, such as based on a reservation request submitted directly at the EVSE; etc.).

Scheduling a reserved charging session for an EVSE (e.g., a single EVSE unit at a single location; etc.), can include updating a calendar for the EVSE with suitable reservation parameters, reserved charging session data (e.g., the scheduled time period for the reserved charging session; etc.), and/or other suitable data (e.g., user data; electric vehicle data; etc.). In specific example, each EVSE can be associated with their own calendar that can be used for facilitating reserved charging sessions and/or ad hoc charging sessions.

An EVSE reservation calendar is preferably cloud-based (e.g., available on-demand via Internet connectivity; etc.). In specific examples, the calendar can be updated (e.g., via one or more APIs) and/or otherwise modified by one or more applications (e.g., a plurality of applications through which reservation requests and/or modifications can be made; etc.). In specific examples, the calendar can account for historic, current, and future charging sessions. In variations, a set of EVSEs and/or a charging location (e.g., a charging location where a plurality of EVSEs reside; etc.) can share one or more calendars.

In a specific example, an EVSE can be associated with a single, cloud-based calendar for tracking ad hoc charging sessions and a set of reserved charging sessions (e.g., including any suitable reserved charging sessions for the EVSE; etc.). EVSEs can be operated in one or more disconnected modes (e.g., when there are connectivity issues between the EVSE and a corresponding cloud-based reservation calendar; etc.). A disconnected mode can be implemented based on one or more disconnected mode parameters associated with an EVSE. In an example, an EVSE is operable in a disconnected mode in response to a connectivity issue (e.g., in response to not being able to establish communication between a centralized reservation system and the EVSE; in response to lack of expected updates for the calendar from the associated EVSE; etc.) between the EVSE and the single, cloud-based calendar associated with the EVSE. In specific examples, operating the EVSE in the disconnected mode can include at least one of: allowing ad hoc charging sessions (e.g., in a mode only allowing for ad hoc charging sessions and not reserved charging sessions; etc.) and/or canceling the set of reserved charging sessions (e.g., cancelling currently reserved charging sessions for the EVSE; preventing future scheduling of reserved charging sessions, such as until connectivity with the EVSE is re-established; etc.); facilitating implementation of the set of reserved charging sessions (e.g., facilitating implementation of already-scheduled reserved charging sessions; such as when the EVSE has sufficiently local compute and memory to carry out such charging sessions; etc.) and/or preventing scheduling of future reserved charging sessions; shutting down the EVSE; and/or any other suitable actions.

However, calendars (e.g., EVSE-associated calendars; etc.) for facilitating charging sessions can be configured in any suitable manner.

Scheduling one or more reserved charging sessions is preferably performed after (e.g., in response to; at a time after; etc.) receiving one or more reservation requests, but can additionally or alternatively be performed automatically (e.g., independent of a reservation request; etc.), and/or at any suitable time relative portions of embodiments of the method 100, and/or at any suitable time.

However, scheduling one or more reserved charging sessions S120 can be performed in any suitable manner.

2.3 Determining a Check in.

Embodiments of the methods 100, 300, and/or 400 can include determining one or more check ins for one or more charging sessions S130 and/or S330, which can function to identify when a user, electric vehicle, and/or other entity has arrived for a given charging session.

Determining one or more check ins is preferably performed or one or more reserved charging sessions, but can additionally or alternatively be performed for any suitable type of charging sessions (e.g., ad hoc charging sessions; etc.).

A check in preferably indicates that an electric vehicle associated with a reserved charging session is ready to be charged (e.g., an EVSE is plugged into the electric vehicle; the electric vehicle is at the location of the EVSE, such as a selected EVSE and/or an EVSE associated with a determined charging location; etc.). Additionally or alternatively, a check in can indicate that a user has arrived at an EVSE and/or charging location corresponding to a reserved charging session, and/or can a indicate any other suitable information.

Determining a check in preferably includes determining one or more of a check in time (e.g., which can be compared to an early check in limit parameter if the check in time is prior to the corresponding reservation start time; which can be compared to a reservation grace period parameter if the check in time is after a corresponding reservation start time; etc.); user data (e.g., indicating the user who is checking in; etc.); electric vehicle data (e.g., indicating the electric vehicle to be charged during the reserved charging session; etc.); EVSE data (e.g., physical identifier and/or other suitable identifier of the EVSE that a user has checked in at, such as for when a plurality of EVSEs at one or more charging locations are eligible to be used by the user for a reserved charging session; etc.); and/or any other suitable data.

Determining one or more check ins can be based on one or more of: user input at a user device (e.g., user inputs, at a mobile application, indicating that the user has checked in and/or arrived at an EVSE and/or charging location associated with a reserved charging session; etc.); user location (e.g., based on location of a user device at and/or proximal an EVSE and/or charging location associated with a reserved charging session; etc.); user input at an EVSE; plugin of an EVSE into an electric vehicle; and/or any other suitable data indicative of a user check in for a charging session.

Determining one or more check ins is preferably performed by a reservation system (e.g., a centralized reservation system; a reservation system receiving check in indications from user devices, electric vehicles, EVSEs, and/or other suitable components; etc.), but can additionally or alternatively be performed by any suitable entities.

Determining a check in for a reserved charging session is preferably performed after scheduling the reserved charging session (e.g., where check ins are for reserved charging sessions that have been scheduled beforehand, etc.), but can additionally or alternatively be a performed at any suitable time relative portions of embodiments of the method 100, and/or at any suitable time.

2.3.1 Code-Enabled Charging Experience

Figure 11B:
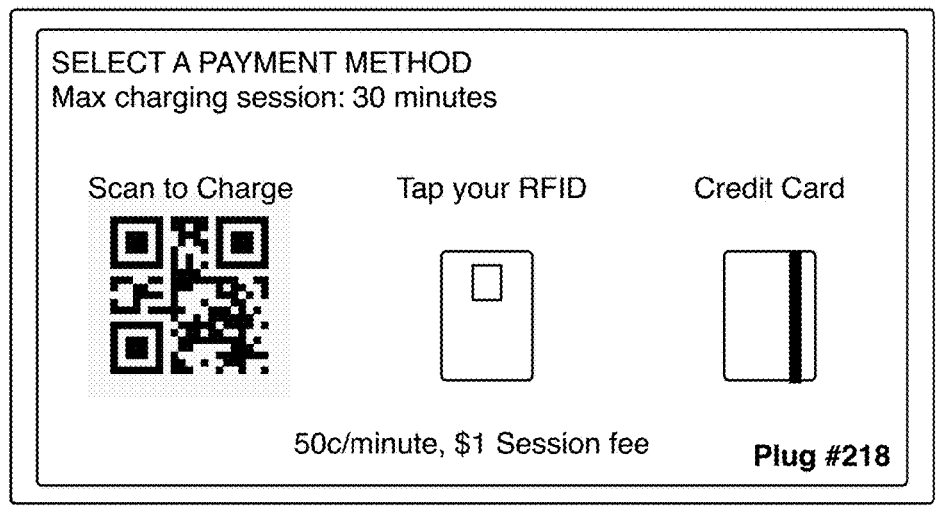
Figure 11C:
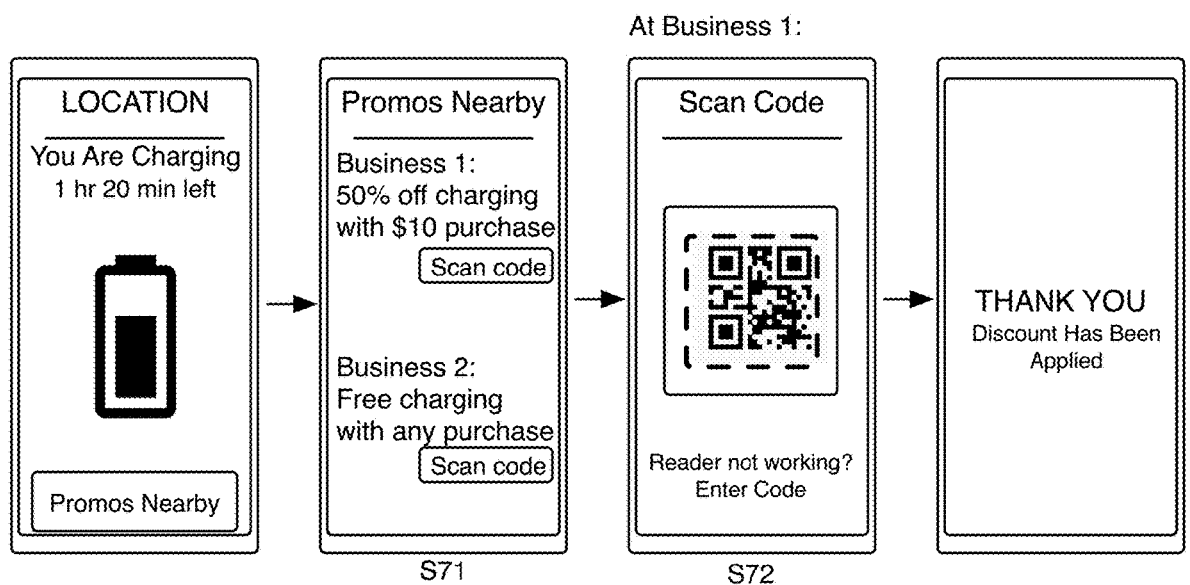
Figure 11D:
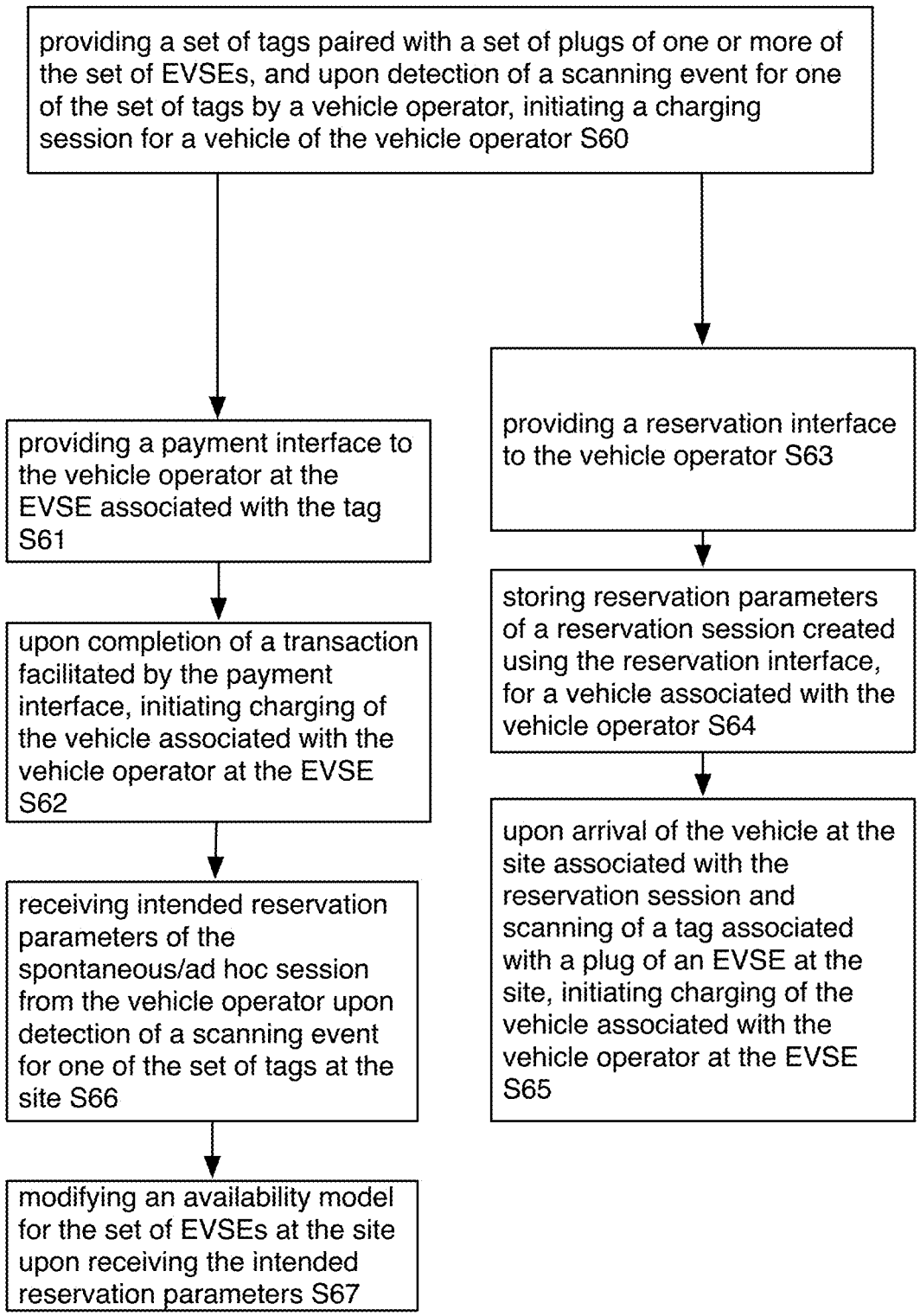

In one variation, as shown in FIGS. 11A-11C, the system can assign a unique identifier to each of a set of plugs associated with a set of EVSEs, where each of the set of EVSEs can have one or more plugs. During use, vehicle operators can then check in to a particular plug/EVSE using the unique identifier, where, as described in related examples, checking in can include scanning a tag associated with the plug/EVSE and encoding the unique identifier. As shown in FIG. 11A, the tag can include a QR code, and scanning the QR code using an image capturing application of a mobile device of a vehicle operator can trigger initiation of a charging session for the plug/EVSE. Embodiments of the tag can, however, have another suitable form (e.g., barcode, sequence of characters that can be manually or automatically entered, etc.) and/or be used for initiation of charging in another suitable manner. As such, methods associated with initiating vehicle charging sessions can include providing a set of tags paired with a set of plugs of one or more of the set of EVSEs, and upon detection of a scanning event for one of the set of tags by a vehicle operator, initiating a charging session for a vehicle of the vehicle operator S60, as shown in the flowchart of FIG. 11D.

In relation to ad hoc or spontaneous charging sessions, initiation of the charging session can include: providing a payment interface to the vehicle operator at the EVSE associated with the tag (e.g., through a display of the EVSE, at an application of the mobile device used to scan the tag, etc.) S61; and upon completion of a transaction facilitated by the payment interface, initiating charging of the vehicle associated with the vehicle operator at the EVSE S62. An example of the payment interface is shown in FIG. 11B.

In relation to reserved charging sessions (e.g., sessions reserved prior to arrival at the EVSE), the system can provide, (e.g., through the application executing at the mobile device of a vehicle operator associated with a reserved charging session) a user interface depicting location features (e.g., location name, location address, etc.) associated with candidate EVSEs at which the vehicle can undergo charging sessions. The user interface can further allow the vehicle operator to bookmark a subset of candidate locations (e.g., to provide more efficient access to candidate sites during current/subsequent charging sessions). Then, once the vehicle is physically at the site of the EVSE associated with the reservation, the vehicle operator can access any available plug of the EVSE(s) at the site, and check in by scanning the tag of the plug to initiate charging. As such, initiation of the charging session can include: providing a reservation interface to the vehicle operator (e.g., at an application of a mobile device of the vehicle operator) S63; storing reservation parameters of a reservation session created using the reservation interface, for a vehicle associated with the vehicle operator S64, the set of reservation parameters including parameters for at least one of a site, a set of EVSEs at the site, and a time window associated with the reservation session; upon arrival of the vehicle at the site associated with the reservation session and scanning of a tag associated with a plug of an EVSE at the site, initiating charging of the vehicle associated with the vehicle operator at the EVSE S65.

For sites at which EVSE/plug reservation is available, the method can include (for spontaneous/ad hoc sessions): receiving intended reservation parameters of the spontaneous/ad hoc session from the vehicle operator upon detection of a scanning event for one of the set of tags at the site S66, where the reservation parameters include an intended duration of the charging session; and modifying an availability model for the set of EVSEs at the site upon receiving the intended reservation parameters S67. For sites at which EVSE/plug reservation is not available, initiation of the charging session can include charging the vehicle according to a set of power output parameters until at least one of the following occurs: a battery of the vehicle is fully charged, or a maximum charging session limit is incurred by the vehicle.

As shown in FIG. 11C, scanning of the tag can further trigger subsequent actions. For instance, upon detection of a scanning event associated with a tag, the system can provide promotional content to the vehicle operator (e.g., through an application of a mobile device used to scan the tag), where the promotional content includes a list of vendors in proximity to the site of charging. In providing the list, the system can extract the location of the EVSE associated with the tag, and implement a proximity model to extract a set of appropriate promotions (e.g., based upon a distance threshold, based upon a profile of the vehicle/vehicle operator, etc.) S71. A corresponding tag can also be available at a vendor site associated with the promotional content, and upon detection of a scanning event associated with the corresponding tag and the vehicle operator, the vehicle operator can be provided with the promotion S72. As such, while the vehicle is charging, the vehicle operator can be incentivized to support operations of one or more nearby vendors in a manner that benefits both the vehicle operator and the vendor(s).

However, determining a check in for a reserved charging session S130 and/or S330 can be performed in any suitable manner.

2.4 Causing Charging of an Electric Vehicle.

Embodiments of the methods described (e.g., methods 100, 300, and/or 400) can include causing charging of one or more electric vehicles for one or more reserved charging sessions S140, S340, and/or S350, which can function to provide charging in one or more reserved charging sessions.

Causing charging of one or more electric vehicles is preferably performed by causing one or more EVSEs to charge the one or more electric vehicles, but can additionally or alternatively be performed with any other suitable components.

Causing charging of one or more electric vehicles is preferably based on one or more integrations with one or more EVSEs. In examples, an integration (e.g., of the reservation system; etc.) with one or more EVSEs can allow remote communication (e.g., wireless communication; etc.) between the one or more EVSEs and another component (e.g., reservation system; etc.). In specific examples, integrations with one or more EVSEs can be based on one or more of: the Open Charge Point Protocol (OCPP) (e.g., for supporting communication between EVSEs and a central management system network; etc.), the Open Charge Point Interface protocol (OCPI) (e.g., for supporting connections between mobility service providers such as entities having electric vehicle drivers as customers, and Charge Point operators such as managers of EVSEs; etc.); and/or any other suitable protocols. In a specific example, an integration with one or more EVSEs can include an integration, via OCPI, with the network who can forward commands (e.g., control signals; etc.) to corresponding EVSEs.

Controlling (e.g., remotely controlling; etc.) one or more EVSEs can include issuing one or more of: start charging commands (e.g., a "remoteStart" API call through OCPI, where the API call can result in a control signal being forwarded by the network to one or more EVSEs; for the EVSE to begin charging of an electric vehicle; such as in response to determining a check in of a user for a reserved charging session associated with the EVSE; etc.); stop charging commands (e.g., a "remoteStop" API call through OCPI, where the API call can result in a control signal being forwarded by the network to one or more EVSEs; for the EVSE to stop charging of an electric vehicle; such as in response to a current time reaching a reservation end time; such as in response to a fully charged state of the electric vehicle; etc.); and/or any other suitable commands (e.g., for requesting data, such as charging session data for updating a calendar associated with the EVSE; etc.).

In a specific example, causing the EVSE to charge an electric vehicle (e.g., for an ad hoc charging session; etc.) based on an integration with the EVSE can include remotely issuing a first start charging command to the EVSE; and where causing the EVSE to charge an electric vehicle (e.g., a different electric vehicle; a same electric vehicle; etc.) (e.g., for a reserved charging session; etc.) based on an integration with the EVSE can include remotely issuing a second start charging command to the EVSE.

In variations, for a given reserved charging session, a plurality of EVSEs (e.g., a plurality of EVSEs in a single charging location; etc.) can service an electric vehicle associated with the reserved charging session. In a specific example, a user scheduled for a reserved charging session at a charging location including a plurality of EVSEs is not limited to use of a single EVSE of the plurality of EVSEs for the reserved charging session. In a specific example, a user can use any suitable available EVSE for a charging session at a charging location including a plurality of EVSEs. In a specific example, a charging location including a plurality of EVSEs can specify that a predetermined number of the plurality of EVSEs (e.g., a predetermined number that is less than the number of EVSEs in the plurality of EVSEs; etc.) are to be made available for reserved charging sessions (e.g., x number of EVSEs allotted to serving reserved charging sessions out of y number of total EVSEs for the charging location; etc.), and/or the remaining number of EVSEs are to be made available on a first come first served basis (e.g., y number of total EVSEs minus x number of EVSEs allotted to serving reserved charging sessions; etc.). In a specific example, the predetermined number of the plurality of EVSEs allotted for reserved charging sessions can correspond to any suitable EVSEs of the plurality of EVSEs (e.g., specific EVSEs are not specified; etc.), where a user can select any available EVSE of the plurality of EVSEs for a reserved charging session (e.g., such as long as the number of EVSEs serving reserved charging sessions is equal to the predetermined number, x, of EVSEs allotted to serving reserved charging sessions at the charging location; etc.). Alternatively, the predetermined number of the plurality of EVSEs allotted for reserved charging sessions can correspond to specified EVSEs (e.g., specified by a site host, a community management admin, etc.).

Causing an EVSE to charge an electric vehicle can be based on a physical identifier (and/or other suitable identifiers) for the EVSE. The physical identifier can be physically present at the EVSE (e.g., on the EVSE; etc.), can be unique to the EVSE, and/or can otherwise be configured. One or more physical identifiers can be mapped to one or more virtual identifiers (e.g., stored at a reservation system in association with the EVSE; etc.), but can additionally or alternatively associated with any suitable components.

Causing an EVSE to charge an electric vehicle based on a physical identifier can include selecting the EVSE to remotely issue a command to based on the physical identifier of the EVSE. In a specific example, an EVSE can be from a set of EVSEs associated with a charging location (e.g., where a single charging location includes a plurality of EVSEs; etc.), where each EVSE from the set of EVSEs corresponds to a unique physical identifier, where remotely issuing a first start charging command includes remotely issuing the first start charging command to the EVSE based on the physical identifier for the EVSE. In the specific example and/or other suitable specific examples, remotely issuing a second start charging command can include remotely issuing the second start charging command to the EVSE based on the physical identifier for the EVSE.

In examples, a user can provide a physical identifier (e.g., for an EVSE selected by a user from a set of EVSEs associated with a single charging location; etc.). Users can provide physical identifiers through one or more of: a user device (e.g., through an application for the user device; etc.), an EVSE (e.g., through an EVSE interface; etc.), an electric vehicle, and/or any other suitable components. In a specific example, the method 100 can include prompting a user to provide the physical identifier for the EVSE selected by a user from the set of EVSEs (e.g., of a single charging location; etc.) for the reserved charging session; and/or receiving the physical identifier for the EVSE from the user. Additionally or alternatively, an EVSE physical identifier and/or other suitable EVSE identifiers can be automatically collected (e.g., based on a plug-in of the EVSE charger to the electric vehicle, etc.). EVSE identifiers and/or other suitable identifiers can be collected from EVSEs, electric vehicles (e.g., plugged-in with an EVSE; etc.), mobile devices (e.g., mobile phones, etc.), users, and/or any other suitable entities.

Causing an EVSE to charge an electric vehicle can be based on a power distribution type associated with one or more reservation parameters and/or other suitable parameters. There can be a user opt-in distribution type for power distribution associated with the solar production parameter, the infrastructure-limitation parameter, and the time-of-use parameter; a uniform power distribution type associated with the equally reduced power reduction parameter and the separately reduced power parameter; and a condition-based distribution type for distributing power associated with the condition-based parameter. A user opt-in power distribution type causes the EVSE to dynamically throttle the power output based on the associated reservation parameter (and/or other suitable reservation parameters that justifies throttling the EVSE to satisfy said reservation parameters). In specific examples, the reservation parameter can include one or more opt-in indications or opt-out indications for one or more power distribution types (e.g., a power reduction offered at a cheaper price. In examples, a uniform power distribution type causes the EVSE to throttle power equally among a set of EVSE (e.g., to keep total kW under a certain amount), or to deactivate individual EVSEs among a set of EVSE (e.g., deactivating a number of EVSE among a set of EVSE to keep total kW under a certain amount, etc.).

In examples, a condition-based power distribution type causes the EVSE to charge the electric vehicle based on the battery level associated with (e.g., needed for; required by; correlated with; etc.) a route or job (e.g., using telematics data, vehicle data, user data, and/or other suitable data and parameters, etc.). In a specific example, a condition-based distribution type can intelligently distribute power by determining the battery level needed based on the difference between current battery level and the needed battery level for the next job or route, and causing the EVSE to charge the electric vehicle for the needed battery level. A condition-based power distribution type can additionally or alternatively be used to plan for a road trip (via mobile applications, etc.), whereby optimal charging stops can be determined based on battery level needed for the subsequent charging stop (e.g., using telematics data such as including one or more of driver driving efficiency, total driving distance between charging stops, EVSE data indicating current availability, etc.).

In a specific example, user opt-in distribution types can be implemented for non-fleet users and/or scenarios, and condition-based power distribution types can be implemented for fleet users and/or scenarios.

However, power distribution types can be configured in any suitable manner.

In a specific example, causing the EVSE to charge an electric vehicle (e.g., for an ad hoc charging session; etc.) in accordance with a power distribution type based on an integration with the EVSE can include remotely issuing a start charging command to the EVSE; where causing the EVSE to charge an electric vehicle (e.g., a different electric vehicle; a same electric vehicle; etc.) (e.g., for a reserved charging session; etc.) based on an integration with the EVSE can include remotely issuing a continue charging command in accordance with a power distribution type for the charging session; and where causing the EVSE to continue charging based on an integration with the EVSE can include remotely issuing a throttle power output command for the EVSE in accordance with the power distribution type and/or access parameters.

In variations, electric vehicle location can be used in facilitating access and/or authentication. For example, if an electric vehicle arrives (e.g., tracked using vehicle location, etc.) proximal (e.g., at, etc.) an EVSE location within a threshold time period for a charging session (e.g., a reserved charging session where the electric vehicle is expected to arrive at the location and time; etc.), then access and/or authentication can be automatically granted (e.g., not requiring a morse code handshake, etc.). In a specific example, if more than one vehicle arrives in a threshold time window, a morse code authentication process can be used to differentiate the vehicles (e.g., where a short code, such as a 2-digit code, could be used).

In variations, group codes can be generated for a fleet, community, and/or other set of vehicles, where such a code can be shared across the set of vehicles. A group code can be refreshed (e.g., on a periodic interval, such as daily, etc.). Communities can be associated with and/or include one or more of workplaces, multi-unit dwellings, school campuses, hospitality, and/or other suitable community settings. In specific examples, group codes can be 3-digits in length and/or any suitable length (e.g., shorter lengths; longer lengths to accommodate scenarios where a larger number of vehicles are expected to be at an EVSE site at the same time, where the longer group code can be used to differentiate, etc.). In specific examples, group codes can be associated with different access parameters (e.g., a pricing parameter, a dedicated time slot parameter, etc.) to allow for group and/or time-specific pricing.

However, morse codes and associated authentication approaches can be configured in any suitable manner.

Causing charging of one or more electric vehicles is preferably performed by a reservation system (e.g., a centralized reservation system in remote communication with a set of EVSEs for issuing one or more commands; etc.), but can additionally or alternatively be performed by any suitable components.

Causing charging of one or more electric vehicles is preferably performed after (e.g., in response to; etc.) determining a check in of a user for a reserved charging session (e.g., where an EVSE associated with the reserved charging session is caused to charge an electric vehicle for a user associated with the reserved charging session; etc.), but can additionally or alternatively be performed at any suitable time relative portions of embodiments of the method 100, and/or at any suitable time.

Causing charging of one or more electric vehicles can be based on (e.g., dependent upon, etc.) determining payment (e.g., for the charging session; etc.) and/or authentication. Determining payment and/or authentication can be performed by one or more of: a charger management system, a reservation system, an application of a user device, an EVSE, and/or any other suitable components.

However, causing charging of one or more electric vehicles S140, S340, and/or S350 can be performed in any suitable manner.

2.5 Facilitating an Ad Hoc Charging Session.

Embodiments of the methods 100, 300, and/or 400 can additionally or alternatively include facilitating one or more ad hoc charging sessions S150, which can function to guide and/or implement one or more ad hoc charging sessions. Additionally or alternatively, embodiments of the method 100 can prevent one or more ad hoc charging sessions (e.g., in response to determination of ineligibility of a user for an ad hoc charging session; etc.).

An ad hoc charging session preferably includes a charging session that was not reserved ahead of time, such as a charging session that is being requested for a current time at an EVSE and/or charging location, such as at an EVSE and/or charging location that is proximal (e.g., nearby; at; etc.) a user location (e.g., determined based on a user device location; etc.).

Facilitating one or more ad hoc charging sessions can additionally or alternatively include determining eligibility for an ad hoc charging session (e.g., for an electric vehicle at an EVSE; etc.) S152; accounting for an ad hoc charging session S154; causing an EVSE to charge the electric vehicle for the ad hoc charging session S156; and/or any other suitable processes for facilitating one or more ad hoc charging sessions S150.

Determining eligibility for an ad hoc charging session S152 can function to determine whether to allow an ad hoc charging session for a user. Determining eligibility for an ad hoc charging session is preferably based on one or more reservation parameters (e.g., from a reservation request; etc.) and/or one or more EVSE reservation parameters.

In examples, determining eligibility for an ad hoc charging session can be based on a comparison between an ad hoc time period (e.g., a current time period; a time associated with request of an ad hoc charging session by a user; etc.) and a scheduled time period. In a specific example, determining eligibility for the ad hoc charging session based on the comparison between the ad hoc time period and the scheduled time period can include: determining a length of time difference between the ad hoc time period and the scheduled period (e.g., where the length of time difference can include the amount of time from a current time until the reservation start time for the next scheduled reserved charging session; etc.); and/or in response to the length of time difference exceeding a first length of time difference threshold (e.g., a predetermined threshold, such as 30 minutes, 45 minutes, 60 minutes, etc.; an automatically determined threshold, such as based on the schedule of reserved charging sessions and/or other suitable variables; etc.), determining that a user (e.g., associated with the second electric vehicle, etc.) and/or other suitable entity is eligible for the ad hoc charging session. In a specific example, determining eligibility for the ad hoc charging session based on the comparison between the ad hoc time period and the scheduled time period can include: in response to the length of time difference exceeding a second length of time difference threshold (e.g., when the time until the upcoming reserved charging session is sufficiently large, such as greater than the maximum session duration for the EVSE; such as greater than an ad hoc time period corresponding to a predicted ad hoc charging session duration indicated by a user input describing an end time and/or desired charging session duration for the ad hoc charging session; etc.), determining that a user (e.g., associated with second electric vehicle; etc.) and/or other suitable entity is eligible for the ad hoc charging session for a duration specified by a maximum session duration parameter associated with the EVSE. Determining eligibility for an ad hoc charging session can include collecting one or more user inputs (e.g., in response to prompting the user for a user input, such as at a mobile application and/or at a vehicle application; etc.) describing an end time and/or desired charging session duration for the ad hoc charging session, such as where an ad hoc time period can be based on the one or more user inputs (e.g., desired ad hoc charging session duration and/or end time; etc.). Determining eligibility can include processing an ad hoc charging session as a reserved charging session associated with a reservation start time parameter of the current time (e.g., now).

However, determining eligibility for an ad hoc charging session S152 can be performed in any suitable manner.

Accounting for an ad hoc charging session S154 can function to track, record, and/or otherwise account for the ad hoc charging session, such as to prevent scheduling of reserved charging sessions that would overlap with the ad hoc charging session and/or a threshold time period after the ad hoc charging session. Accounting for one or more ad hoc charging sessions can include one or more of: updating EVSE calendars (e.g., for EVSEs used in the one or more ad hoc charging sessions; etc.); recording ad hoc charging session data; and/or any other suitable processes.

However, accounting for an ad hoc charging session S154 can be performed in any suitable manner.

Causing an EVSE to charge one or more electric vehicles for one or more ad hoc charging sessions S156 can function to implement the ad hoc charging session with the EVSE.

Causing an EVSE to charge one or more electric vehicles for one or more ad hoc charging sessions is preferably performed after (e.g., in response to; etc.) receiving a request for an ad hoc charging session (e.g., from a user at a user device; from a user via an EVSE interface; etc.), but can additionally or alternatively be performed at any suitable time relative portions of embodiments of the method 100, and/or at any suitable time.

Causing an EVSE to charge one or more electric vehicles for one or more ad hoc charging sessions S154 can be performed in any suitable manner analogous to and/or similar to causing an EVSE to charge one or more electric vehicles for one or more reserved charging sessions S140. However, causing an EVSE to charge one or more electric vehicles for one or more ad hoc charging sessions S156 can be performed in any suitable manner.

Any suitable portions of facilitating one or more ad hoc charging session with an EVSE can be performed at any suitable time period relative facilitating one or more reserved charging sessions with the EVSE. In a specific example, an EVSE can be used in implementing a first ad hoc charging session, followed by a first reserved charging session, followed by a second ad hoc charging session, followed by a second reserved charging session, etc. Additionally or alternatively, any suitable number of ad hoc charging sessions and/or reserved charging sessions can be implemented with an EVSE in any suitable order at any suitable time (e.g., any suitable mixture of ad hoc charging session(s) and reserved charging session(s), etc.). However, facilitating one or more ad hoc charging sessions can be performed at any suitable time relative portions of embodiments of the method 100, and/or at any suitable time.

Any suitable number of ad hoc charging sessions can be facilitated. In a specific example, an EVSE can be used in implementing a plurality of ad hoc charging sessions and a plurality of reserved charging sessions for a given time period (e.g., for a given day; etc.). In a specific example, a first EVSE can be used in implementing an ad hoc charging session concurrently with a second EVSE used in implementing a reserved charging session. However, any suitable number of EVSEs can implement any suitable number of ad hoc charging sessions and/or reserved charging sessions concurrently, sequentially, and/or at any suitable time in any suitable order.

However, facilitating one or more ad hoc charging sessions S150 can be performed in any suitable manner.

2.5.1 Flexible EVSE Reservation

In some variations of scheduling and facilitating charging sessions (e.g., reserved charging sessions, ad hoc charging sessions), the system can be configured to implement methods for providing site-based, virtual reservations in a manner that provides flexibility, reduces charging conflicts, and an improved user experience. The methods can apply to a set of EVSEs at a particular site, in order to improve handling of multiple vehicles at the set of EVSEs. Such methods can function to reduce the number of charging conflicts (e.g., due to a vehicle overstaying a charging session), to provide flexibility in relation to early arrival of a vehicle for charging, to reduce or eliminate issues related to drivers identifying/locating specific EVSEs associated with their respective charging sessions, and to provide other suitable functions. In one such variation, a site associated with a set of EVSEs can have a single associated calendar for the location (e.g., in contrast with having n calendars for n EVSEs), where the single associated calendar splits time into blocks (B) of x minutes, where each block has n availability slots corresponding to the number of reservable EVSEs (e.g., non-occupied EVSEs), thereby providing flexibility. As such, arriving vehicles can interface with any open EVSE at the site, in order to resolve conflicts and provide flexibility.

Figure 10A:
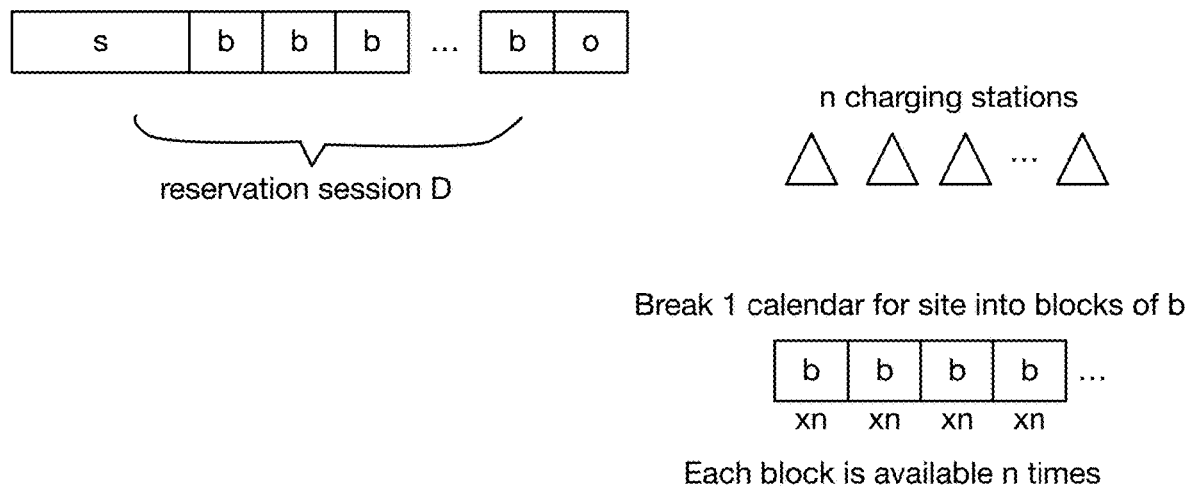

In relation to this variation, as shown in FIGS. 10A and 10E, for a minimum session length (s), a minimum incremental size (b) corresponding to block size, an optional overstay grace period (O, where O<s), an a set of n charging stations, a single calendar for a site associated with the n charging stations can have time window blocks of b, where each block is available n times and a particular reservation session requires a number of blocks, where the number of blocks is a function of the reservation duration (D) and the block size (b). In one example, a particular reservation session can be equal to $f(D, b)$, where $f(D,b)=\text{ceiling}(D/b)$. As shown in FIG. 9E, each slot in the time array associated with the site calendar starts at n, and whenever a reservation occurs, the blocks covered will decrease the corresponding slot by 1 until a slot is zero, which means that the slot is no longer available.

Figure 10B:
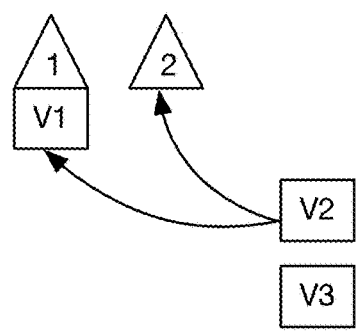
Figure 10C:
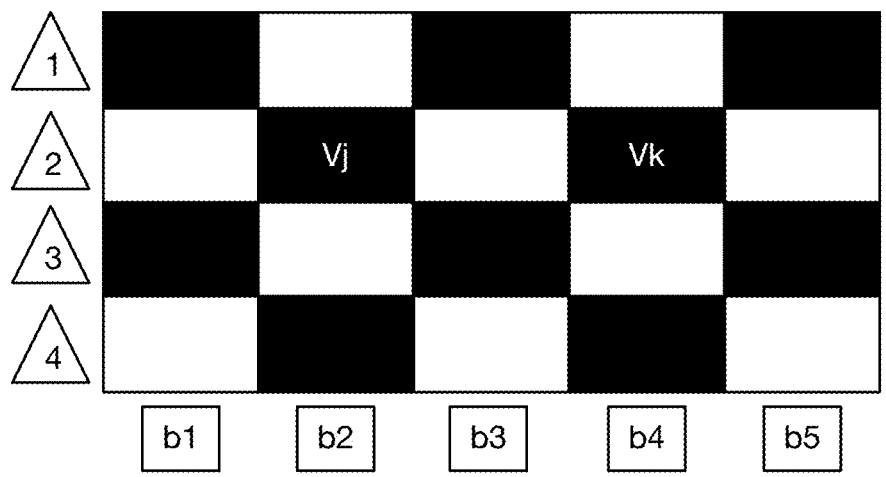
Figure 10D:
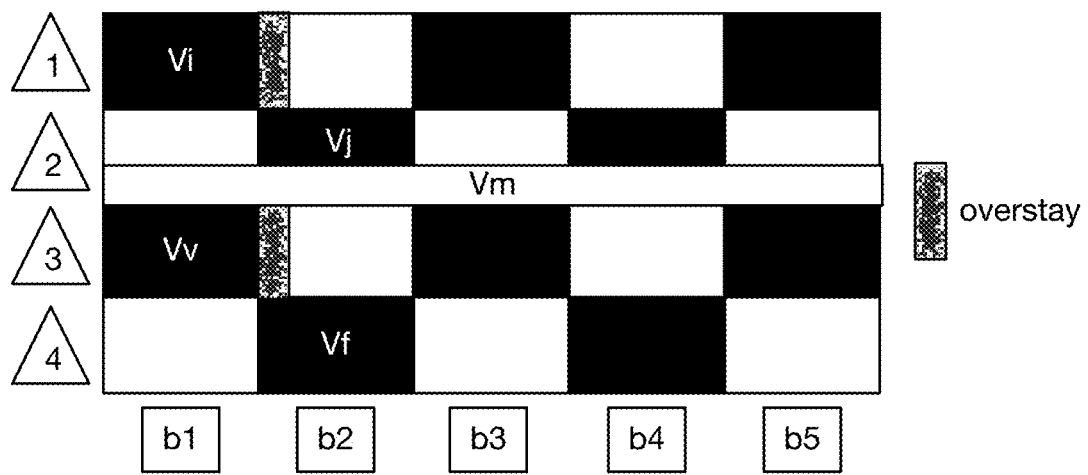

In this variation, by allowing drivers to freely select any available charger at a site (e.g., for a reserved charging session, for an ad hoc charging session), the method allows a self-optimizing solution by preventing queue buildups for a particular EVSE at a site, and allowing any open EVSE to be occupied. For instance, in relation to the scenario shown in FIG. 10B, for a first EVSE (triangle 1) occupied by vehicle 1 (V1), when a second vehicle (V2) arrives with a fixed reservation at the first EVSE, the second vehicle (V2) would have to wait for the first EVSE, thereby creating a user conflict. In the alternative solution provided by this variation, the second vehicle (V2) would be able to occupy a second EVSE (triangle 2), thereby postponing conflict to a situation in which a a third vehicle (V3) arrives. In this situation, the first vehicle may leave prior to arrival of the third vehicle, and as such, no conflict would occur. Expanding this further to multiple vehicles/EVSEs, as shown in FIGS. 10C and 10D, such a solution prevents a checkerboard scheduling problem associated with individual calendars corresponding to each EVSE at the site. In particular, for each time block (i.e., b1, b2, b3, b4, and b5) across EVSEs 1, 2, 3, and 4, arriving vehicles (e.g., Vj, Vk, Vm) can select open EVSEs, and for each time block there are likely one or more EVSEs open for charging.

Furthermore, in relation to FIG. 10D, an incoming vehicle only is conflicted out of charging upon arrival at the site if certain combinations of vehicles overstaying reservation blocks (e.g., as shown in extended rectangular shapes beyond the boundary of a particular block) and/or arrival of vehicles for reserved sessions occurs. In one example, as shown in FIG. 10D, if vehicles (Vi and Vv) are overstaying and vehicle (Vf) is arriving on time for a reservation at the site, the method can include notifying an operation of a vehicle (Vj) arriving ad hoc that he/she has the right of way for the EVSE(s) in which vehicles Vi and Vv are overstaying, thereby optimizing vehicle Vj's wait time. In this example, Vj's wait time is the minimum time associated with the earliest of EVSEs 1, 2, 3, and 4 opening.

As shown in FIG. 10E, for a minimum session length (s), a minimum incremental size (b) corresponding to block size, an optional overstay grace period (0, where 0<s), a set of n charging stations, a single calendar for a site associated with the n charging stations can have time window blocks of b, where each block is available n times and a particular reservation session requires a number of blocks, where the number of blocks is a function of the reservation duration (D) and the block size (b). As shown in FIG. 10E, each slot in the time array associated with the site calendar starts at n, and whenever a reservation occurs, the blocks covered will decrease the corresponding slot by 1 until a slot is zero, which means that the slot is no longer available.

FIG. 10F extends the configuration depicted in FIG. 10E to a site with 3 EVSEs (i.e., n=3), 20 blocks (B) that are 30 minutes long, and an overstay grace period (O) of 10 minutes. For a scenario where a first reservation takes 6 blocks (e.g., b1-b5, with overstay grace into b6), a second reservation takes 7 blocks (e.g., b3-b8, with overstay grace into b9), and a third reservation takes 8 blocks (e.g., b3-b10, with overstay grace into b11): blocks b1 and b2 are decreased by 1 (for reservation 1), blocks b3 through b6 are decreased by 3 (for reservations 1-3), blocks b7 through b9 are decreased by 2 (for reservations 2-3), blocks b10 through b11 are decreased by 1 (for reservation 3), and blocks b12 through b20 are not decreased.

Extending the scenario of FIG. 10F to a situation where vehicles overstay (as shown in FIG. 10G): if the vehicle(s) associated with reservation 1 take one overstay block, blocks b1 through b6 are decreased by 1 (for reservation 1). Then, if the vehicle(s) associated with reservation 2 take one overstay block, blocks b1 through b2 are decreased by 1 (for reservation 1), blocks b3 through b6 are decreased by 2 (for reservations 1 and 2), and blocks b7-b9 are decreased by 1 (for reservation 2's overstay). Then, if the vehicle(s) associated with reservation 3 take one overstay block, blocks b1-b2 are decreased by 1 (for reservation 1), blocks b3 through b6 are decreased by 3 (for reservations 1 through 3), blocks b7-b9 are decreased by 2 (for reservations 2-3), and blocks b10 through b11 are decreased by 1 (for reservation 3's overstay).

As shown in the abstracted example of FIG. 10H involving 3 EVSEs, at time b1, EVSE1 is occupied by V1, which has reserved blocks b1-b5 with a grace overstay period into b6. If another vehicle (Vah) arrives, then EVSE2 and EVSE3 are available for ad hoc reservation of just one block size (and the driver of Vah can be notified that he/she can only acquire one block and must leave before b2). Then, at time b2, EVSE1 is still occupied, and vehicle V2 associated with reservation 2 for blocks b3 though b8 (with a grace overstay period into b9) and vehicle V3 associated with reservation 3 for blocks b3 through b10 (with a grace overstay period into b11) may arrive early. Reservation 4 for blocks b10 and b11 can be made, and vehicle V4 associated with reservation 4 can access either EVSE 1 or EVSE3 upon arrival. At time b7, EVSE 1 opens up, and a spontaneous vehicle Vs arrives and charges at EVSE 1 given that it is available. At time b10, V4 arrives and can charge at EVSE3 according to reservation 4. If V2 associated with reservation 2 overstays, then V4's operator can be notified that he/she has right of way at EVSE 3.

Figure 10I:
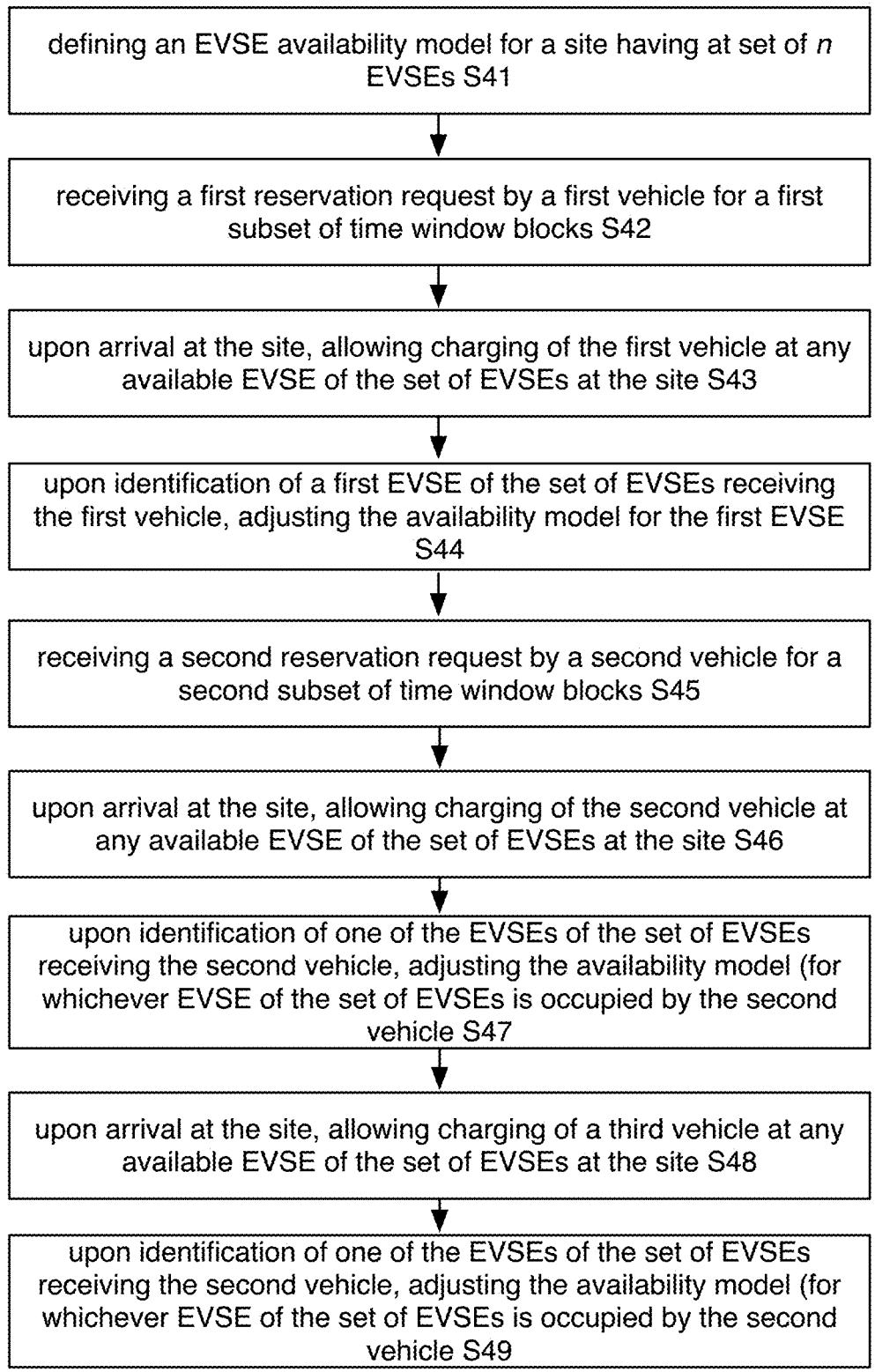

As such, methods for flexible reservations and spontaneous sessions at a site having a set of EVSEs can include, as shown in FIG. 10I: defining an EVSE availability model for a site having at set of n EVSEs S41, wherein the availability model involves a minimum session length (s), a time window block duration (b), an optional overstay grace period (0, where 0<s), where each block is available n times; receiving a first reservation request by a first vehicle for a first subset of time window blocks S42; upon arrival at the site, allowing charging of the first vehicle at any available EVSE of the set of EVSEs at the site S43, wherein allowing charging the of the first vehicle further includes allowing extension of charging beyond the first subset of time window blocks by the overstay grace period; upon identification of a first EVSE of the set of EVSEs receiving the first vehicle, adjusting the availability model for the first EVSE (e.g., by decreasing n for each block of the first subset of time window blocks by one) S44; receiving a second reservation request by a second vehicle for a second subset of time window blocks S45; upon arrival at the site, allowing charging of the second vehicle at any available EVSE of the set of EVSEs at the site S46, wherein allowing charging the of the second vehicle further includes allowing extension of charging beyond the first subset of time window blocks by the overstay grace period; upon identification of one of the EVSEs of the set of EVSEs receiving the second vehicle, adjusting the availability model (e.g., by decreasing n for each block of the second subset of time window blocks by one) for whichever EVSE of the set of EVSEs is occupied by the second vehicle S47; upon arrival at the site, allowing charging of a third vehicle at any available EVSE of the set of EVSEs at the site S48; and upon identification of one of the set of EVSEs receiving the third vehicle, adjusting the availability model (e.g., by decreasing n for each block of a third subset of time window blocks by one) for whichever EVSE of the set of EVSEs occupied by the third vehicle S49.

In variations, the methods can include accommodations for situations when all EVSEs at a site are temporarily unavailable. For instance, as shown in FIG. 10J, in the event all EVSEs of the set of EVSEs are unavailable, the method can include: determining, based upon the availability model, a subset of the set of EVSEs having suitable availability characteristics for an incoming vehicle S50; and notifying an operator of the incoming vehicle regarding the subset of EVSEs for which the operator has right away upon availability of one of the subset of EVSEs 51. In particular, suitable availability characteristics can be based upon one or more of: rankings of determined likelihoods that one or more EVSEs will become available soon (e.g., based upon reservation parameters for each EVSE of the set of EVSEs), based upon determined charging needs of vehicles occupying the set of EVSEs (e.g., estimated charging durations based upon vehicle battery state, estimated charging durations based upon schedules of vehicle operators, etc.), EVSE power output characteristics corresponding to charging needs of the incoming vehicle; and/or other factors.

2.6 Providing a User Interface.

Embodiments of the methods 100, 300, and/or 400 can additionally or alternatively include providing a user interface S160, which can function to provide users with means to communicate with a reservation system and/or other suitable components, such as for submitting, viewing, tracking, modifying, and/or otherwise using reservation requests, check ins, payment, authentication, and/or other suitable processes.

Providing a user interface preferably includes providing a user interface via a mobile application for a mobile user device, but one or more user devices can additionally or alternatively be provided through any suitable applications and/or for any suitable devices.

Providing a user interface can include providing a means for viewing EVSEs and/or charging locations on a map (e.g., where reservation requests can be submitted for such EVSEs and/or charging locations; where information can be provided to the user regarding the EVSEs and/or charging locations; etc.).

In a specific example, the method 100 can include providing a user interface at a mobile application for a user device, where the user interface includes a set of charging location indicators (e.g., graphical indicators on a graphical map; any suitable indicators; etc.) associated with a set of EVSEs including the EVSE, where the reservation request is associated with a charging location indicator of the set of charging location indicators, where the charging location indicator is associated with the EVSE.

In a specific example (e.g., in relation to an ad hoc charging session; etc.), the method 100 can include providing a user interface at a mobile application for user device of a user associated with an electric vehicle, where the user interface includes: a start charging button associated with the ad hoc charging session, where the start charging button is configured to graphically indicate the eligibility for the ad hoc charging session (e.g., based on determining eligibility for the ad hoc charging session S152; etc.); and/or a reservation button for submitting a reservation request for a reserved charging session.

In a specific example, the method 300 can include providing a user interface at a mobile application for a user device, where the user interface can include one or more of a map of the route, a set of charging location indicators associated with a set of EVSEs that have been determined to provide optimum charging (e.g. based on the battery level needed, the distance traveled, driver driving efficiency, and/or other telematics data, etc.), and/or a reservation button for submitting a user reservation request for a reserved charging session, wherein the reservation button can be configured to graphically indicate optimum charging locations based on the battery level needed for the route.

However, providing one or more user interfaces S160 can be performed in any suitable manner.

2.7 Providing a Notification.

Embodiments of the methods 100, 300, and/or 400 can additionally or alternatively include providing one or more notifications S170, which can function to inform and/or guide one or more users (e.g., drivers of electric vehicles, owners of electric vehicles, and/or otherwise associated with electric vehicles; etc.), hosts (e.g., managers of EVSEs and/or charging stations; etc.), and/or any other suitable entities.

Providing notifications preferably includes providing mobile device notifications (e.g., alerts, banners, notification center notifications, lock screen notifications; etc.), but providing notifications can additionally or alternatively include providing notifications to any suitable device and/or entity through any suitable means.

Notifications can include notifications for any suitable portions of embodiments of the method 100, such as notifications for any suitable portions of a charging session (e.g., reserved charging session; ad hoc charging session; etc.). Notifications can include notifications to users and/or hosts for one or more of: reservation scheduling (e.g., notifications for successful reserving a of a reserved charging session; etc.); reservation cancellation (e.g., notifications for reservation cancellation by a host; notifications for reservation cancellation by a user; etc.); reservation approaching (e.g., notifications prior to reservation start time, where different notifications can be provided based on the amount of time until the reservation start time; notifications that can be skipped if a user has checked in for a reserved charging session; etc.); reservation start (e.g., notifications at reservation start time, where such notifications can be skipped if the user has checked in for the reserved charging session; notifications indicating that the reserved charging session will be canceled after a threshold amount of time if the user has not checked in; notifications upon check in by the user for a reserved charging session; notifications upon determining a connected EVSE to the electric vehicle and/or starting of charging, where such notifications can indicate the amount of charging to occur in the charging session; etc.); early check in (e.g., notifications to a host for indicating electric vehicle data, billing data, user data, and/or other suitable information, such as if the EVSE is available for use; notifications if the EVSE is currently unavailable and in use; etc.); charging stopped (e.g., notifications in response to a driver unplugging the EVSE earlier than the reservation end time; notifications indicating that the electric vehicle is fully charge; notifications in response to driver termination of a reserved charging session before reservation end time; etc.); reservation ending (e.g., notifications indicating an upcoming reservation end time during a reserved charging session; notifications indicating overstay penalty for staying past the reservation end time; where such notifications can be skipped if the EVSE is unplugged from the electric vehicle; etc.); reservation completed (e.g., notifications indicating completion of a reserved charging session; etc.); overstay (e.g., notifications based on the overstay penalty associated with the EVSE; notifications indicating that the user has overstayed past the reservation end time, such as notifications provided during an overstay and the EVSE is still connected to the electric vehicle; notifications encouraging the user to move their electric vehicle; etc.); overstay and upcoming reserved charging session (e.g., notifications for when a first user has overstayed past their reservation end time, and when a different reserved charging session is upcoming or being blocked by the first user; notifications encouraging the overstaying user to move their electric vehicle; notifications provided at regular time intervals; etc.); vendor coupons (e.g., notifications for coupons offered by one or more vendors; notifications to users who charged their electric vehicle or used an associated application on their user device near any EVSEs within a suitable threshold distance from a vendor offering a coupon; etc.); new charger available (e.g., notifications to users describing the new EVSE and/or associated information; etc.); events (e.g., notifications for special events such as power outages; co-marketing activities; etc.)

Notifications can include textual content (e.g., text-based communications; any suitable font size, font color, font type; other font parameters; spacing parameters; etc.); graphical content (e.g., communications including images, video, etc.); audio parameters (e.g., audio-based communications such as through music, sound notifications, a human voice; any suitable volume parameters; tone parameters; pitch parameters; etc.); touch content; and/or any other suitable type of content. Notification content can differ based on the type and/or format of the notification. In a specific example, textual content can differ between notifications for different stages and/or aspects of a charging session. In a specific example, textual content can differ between alerts and banners for the same stage and/or aspects of a charging session.

Providing notifications can be performed by a reservation system and/or by any other suitable components. Providing notifications can be performed at any suitable items relative portions of embodiments of the method 100, and/or at any suitable time and at any suitable frequency.

However, providing notifications S170 can be performed in any suitable manner.

3. Other

Embodiments of the methods 100, 300, 400 and/or system 200 can include every combination and permutation of the various system components and the various method processes, including any variants (e.g., embodiments, variations, examples, specific examples, figures, etc.), where portions of embodiments of the method 100 and/or processes described herein can be performed asynchronously (e.g., sequentially), concurrently (e.g., in parallel), or in any other suitable order by and/or using one or more instances, elements, components of, and/or other aspects of the system 200 and/or other entities described herein.

Any of the variants described herein (e.g., embodiments, variations, examples, specific examples, figures, etc.) and/or any portion of the variants described herein can be additionally or alternatively combined, aggregated, excluded, used, performed serially, performed in parallel, and/or otherwise applied.

Portions of embodiments of the method 100, 300 and/or system 200 can be embodied and/or implemented at least in part as a machine configured to receive a computer-readable medium storing computer-readable instructions. The instructions can be executed by computer-executable components that can be integrated with embodiments of the system 200. The computer-readable medium can be stored on any suitable computer-readable media such as RAMs, ROMs, flash memory, EEPROMs, optical devices (CD or DVD), hard drives, floppy drives, or any suitable device. The computer-executable component can be a general or application specific processor, but any suitable dedicated hardware or hardware/firmware combination device can alternatively or additionally execute the instructions.

As a person skilled in the art will recognize from the previous detailed description and from the figures and claims, modifications and changes can be made to embodiments of the method 100, 300, system 200, and/or variants without departing from the scope defined in the claims. Variants described herein not meant to be restrictive. Certain features included in the drawings may be exaggerated in size, and other features may be omitted for clarity and should not be restrictive. The figures are not necessarily to scale. The absolute or relative dimensions or proportions may vary. Section titles herein are used for organizational convenience and are not meant to be restrictive. The description of any variant is not necessarily limited to any section of this specification.

I claim:

1. A method for charging a set of vehicles at a set of Electric Vehicle Service Equipment (EVSE) units, the method comprising:
    determining a collective maximum power output aggregated from individual power outputs of each of the set of EVSEs;
    determining an adjusted power output of each of the set of EVSEs based upon the collective maximum power output and an output constraint, wherein determining the adjusted power output comprises deriving the output constraint from an interaction between a manager of the set of EVSEs and a user interface through which the output constraint can be modulated; and
    executing instructions for delivering the adjusted power output across the set of EVSEs in coordination with a set of charging sessions associated with the set of vehicles and the set of EVSEs.

2. The method of claim 1, wherein the output constraint comprises a limiting power output less than or equal to the collective maximum power output.

3. The method of claim 1, wherein the adjusted power output is derived from a ratio between the output constraint and the collective maximum power output.

4. The method of claim 1, further comprising: dynamically modifying the adjusted power output based upon a set of usage states of one or more of the set of EVSEs.

5. The method of claim 4, wherein the set of usage states comprises a set of occupancy states of the set of EVSEs, wherein dynamically modifying the adjusted power output comprises modifying the adjusted power output in response to at least one of increased occupancy of the set of EVSEs and decreased occupancy of the set of EVSEs.

6. The method of claim 1, further comprising: selecting a subset of the set of EVSEs for prioritized charging based upon power distribution characteristics of the subset of EVSEs.

7. The method of claim 1, further comprising selecting a subset of the set of EVSEs for prioritized charging upon check in of vehicles associated with a particular user group at the subset of the set of EVSEs.

8. The method of claim 1, further comprising: at a user interface for management of the set of EVSEs, receiving an input indicating a scheduled time window for the adjusted power output, and executing instructions for delivering the adjusted power output across the set of EVSEs during the scheduled time window.

9. The method of claim 1, further comprising:
defining an EVSE availability model for a site associated with the set of EVSEs, wherein the availability model involves a minimum session length (s), a time window block duration (b), and where each block is available a number (n) of times corresponding to the number of EVSEs in the set;
receiving a first reservation request by a first vehicle for a first subset of time window blocks;
upon arrival at the site, allowing charging of the first vehicle at any available EVSE of the set of EVSEs at the site;
upon identification of a first EVSE of the set of EVSEs interacting with the first vehicle, adjusting the availability model for the first EVSE;
receiving a second reservation request by a second vehicle for a second subset of time window blocks;
upon arrival at the site, allowing charging of the second vehicle at any available EVSE of the set of EVSEs at the site; and
upon identification of one EVSE of the set of EVSEs interacting with the second vehicle,
adjusting the availability for whichever EVSE of the set of EVSEs is occupied by the second vehicle.

10. The method of claim 9, wherein adjusting the availability model in response to interaction between the first vehicle and the first EVSE comprises decreasing n for each block of the first subset of time window blocks by one.

11. The method of claim 10, wherein adjusting the availability model in response to interaction between the second vehicle and whichever EVSE of the set of EVSE the second vehicle interacts with comprises decreasing n for each block of the second subset of time window blocks by one.

12. The method of claim 9, further comprising dynamically modifying the adjusted power output in response to at least one of: charging of the first vehicle according to the first reservation request; and charging of the second vehicle according to the second reservation request.

13. The method of claim 1, wherein executing instructions for delivering the adjusted power output across the set of EVSEs in coordination with the set of charging sessions comprises:
providing a set of tags paired with a set of plugs of one or more of the set of EVSEs; and upon detection of a scanning event for one of the set of tags by a vehicle operator, initiating a charging session of the set of charging sessions for a vehicle of the vehicle operator.

14. The method of claim 13, wherein the charging session is a spontaneous charging session, the method further comprising:
in response to detection of the scanning event, providing a payment interface to the vehicle operator at the EVSE associated with the tag; and
upon completion of a transaction facilitated by the payment interface, initiating charging of the vehicle associated with the vehicle operator at the EVSE.

15. The method of claim 13, wherein the charging session is a reserved charging session, the method further comprising:
providing a reservation interface to the vehicle operator;
storing reservation parameters of a reservation session created using the reservation interface, for a vehicle associated with the vehicle operator;
upon arrival of the vehicle at the site associated with the reservation session and scanning of a tag associated with a plug of an EVSE at the site, initiating charging of the vehicle associated with the vehicle operator at the EVSE according to reservation parameters of the reservation session.

* * * * *